United States Patent [19]

Mehta et al.

[11] Patent Number: 5,189,412
[45] Date of Patent: Feb. 23, 1993

[54] REMOTE CONTROL FOR A CEILING FAN

[75] Inventors: Vinay Mehta, Germantown, Tenn.; P. C. Leung, Kowloon, Hong Kong

[73] Assignee: Hunter Fan Company, Memphis, Tenn.

[21] Appl. No.: 629,091

[22] Filed: Sep. 11, 1990

Related U.S. Application Data

[63] Continuation of Ser. No. 522,213, May 11, 1990, abandoned.

[51] Int. Cl.⁵ .............................................. H04Q 7/02
[52] U.S. Cl. .................... 340/825.22; 340/825.72; 340/825.69; 340/310 A
[58] Field of Search .................. 340/825.22, 825.69, 340/825.72, 310 R, 310 A, 725, 815.03; 416/5, 61; 417/118; 318/16; 40/442, 451, 452, 463; 315/291, 292, 316; 455/603

[56] References Cited

U.S. PATENT DOCUMENTS

| | | | |
|---|---|---|---|
| D. 249,141 | 8/1978 | Mayo | D13/3 |
| D. 282,462 | 2/1986 | Hart | D13/32 |
| 3,943,421 | 3/1976 | Shibata et al. | 318/484 |
| 4,245,321 | 1/1981 | Gennetten | 364/521 |
| 4,298,869 | 11/1981 | Okuno | 340/815.03 |
| 4,322,632 | 3/1982 | Hart et al. | 307/41 |
| 4,328,540 | 5/1982 | Matsuoka et al. | 364/167.01 |
| 4,371,814 | 2/1983 | Hannas | 318/16 |
| 4,408,150 | 10/1983 | Holston et al. | 318/779 |
| 4,413,211 | 11/1983 | Fowler | 318/257 |
| 4,430,576 | 2/1984 | Fowler | 307/38 |
| 4,433,719 | 2/1984 | Cherry et al. | 236/51 |
| 4,465,956 | 8/1984 | Fowler | 318/268 |
| 4,538,973 | 9/1985 | Angott et al. | 417/572 |
| 4,548,554 | 10/1985 | Angott | 417/572 |
| 4,621,336 | 11/1986 | Brown | 364/557 |
| 4,621,992 | 11/1986 | Angott | 417/572 |
| 4,642,441 | 2/1987 | Kenyon | 219/364 |
| 4,649,323 | 3/1987 | Pearlman et al. | 315/307 |
| 4,689,547 | 8/1987 | Rowen et al. | 315/291 |
| 4,716,409 | 12/1987 | Hart et al. | 340/825.22 |
| 4,719,446 | 1/1988 | Hart | 340/310 A |
| 4,733,138 | 3/1988 | Pearlman et al. | 315/307 |
| 4,734,871 | 3/1988 | Tsunoda et al. | 364/557 |
| 4,762,463 | 8/1988 | Yang | 416/61 |
| 4,768,926 | 9/1988 | Gilbert, Jr. | 416/61 |
| 4,799,176 | 1/1989 | Cacciatore | 364/557 |
| 4,818,920 | 4/1989 | Jacob | 318/16 |
| 4,819,714 | 4/1989 | Otsuka et al. | 236/46 R |
| 4,885,803 | 12/1989 | Hermann et al. | 455/603 |
| 5,041,825 | 8/1981 | Hart et al. | 340/825.69 |

OTHER PUBLICATIONS

Hunter Three Speed Rotary Speed Control Model 2269: Instructions, published, Nov. 1987.
"Comfort-Touch: Coming Soon From Sasablanc", Casabianca Sales Release, Inside Casabianca, published before Jan. 1990.
Emerson 1895 Series "Masterpiece Edition" Programmable Remote Control Ceiling Fan Owners manual, published Oct. 1986.
Techmaster Ceiling Fan and Light Controls, Published 1981.

*Primary Examiner*—Donald J. Yusko
*Assistant Examiner*—Edwin C. Holloway, III
*Attorney, Agent, or Firm*—Baker & Botts

[57] ABSTRACT

A remote control for operating a combination ceiling fan and light fixture features a dual microprocessor control. A microprocessor mounted in the remote control includes a clock and may be programmed to operate the ceiling fan and/or light fixture in a timed manner. A microprocessor mounted in the ceiling fan controls fan speed, fan direction, and light intensity. The two microprocessors communicate over the 60 Hz power line between the remote control and the ceiling fan. The remote control features a control panel for inputting commands from the user, as well as a display for displaying fan and light status as well as time. One feature of the display are animated fan and light displays. The animated fan display appears to rotate in the same direction as the ceiling fan and may also indicate fan speed. The animated light display depicts a light bulb with a series of flashing rays emanating therefrom. The remote control connects in series with the load line of the ceiling fan and features a power supply which provides power for the remote control from the voltage drop of a triac in series with the ceiling fan load line.

25 Claims, 13 Drawing Sheets

REMOTE CONTROL FOR A CEILING FAN

REFERENCE TO RELATED APPLICATIONS

This application is a continuation of application Ser. No. 07/522,213, filed May 11, 1990, now abandoned.

BACKGROUND OF THE INVENTION

1. Field of the Invention

The present invention is directed to a remote control for a combined ceiling fan and light fixture. Specifically, the present invention is directed to a remote control which may be used as a replacement for an existing wall switch and which provides for control of the ceiling fan and accompanying light fixture without any modification to the existing electrical wiring between the wall switch and the light fixture. In an alternative embodiment, the remote control may be an infrared or radio linked remote control communicating with the wall control discussed above, or communicating with a control mounted in the ceiling fan or accompanying light fixture. In either embodiment, the remote control may be equipped with a novel animated display depicting direction and/or speed of fan rotation as well as light intensity.

2. Description of the Prior Art

Ceiling fans known in the prior art provide for a variety of desired features. Specifically, modern ceiling fans may be controlled to operate at a plurality of different speeds from a relatively low speed to a high maximum speed. Low speeds may be desirable to provide for general air circulation and to eliminate "hot" or "cold" spots within a room. Higher speeds may be desirable for cooling effects (in summer) or to eliminate temperature gradients (in winter). In addition, the direction of rotation may generally be controlled to be in either one of two opposite directions. In the winter, it is generally desirable to have the fan turn in one direction (updraft) to circulate hot air away from the ceiling. In the summer, it may be desirable to have the fan turn in the opposite direction (downdraft) to provide a cooling effect on the occupants in the room.

Ceiling fans are often combined with a light fixture or fixtures with the intensity level of the light fixture(s) controlled from low levels to maximum high levels. Most ceiling fans are designed so that they may be installed in existing ceiling junction boxes, replacing existing light fixtures. In such an installation, shown in FIG. 1, there is generally a wall switch 101 switching load line 102 from circuit main 170 in the house. Switched load line 103 and neutral line 104 from circuit main 170 terminate in a ceiling junction box 105. A ceiling fan 106 with light fixture 180 is typically installed attached to junction box 105 in a similar manner as a standard light fixture. Because ceiling fan 106 must be adaptable to existing wiring in the house, fan speed switch 107, fan direction switch 108, and light intensity dimmer switch 109 are usually mounted in the switch housing attached to ceiling fan 106 itself.

Fan mounted switches 107, 108, and 109 may be preset to the desired levels of speed, direction, and light intensity, respectively, and wall switch 101 used to turn ceiling fan 106 and light fixture 180 to these preset levels.

The disadvantage of such an approach is that each time the user wishes to change the existing levels, a switch must be changed at ceiling fan 106. For example, during the daytime, it may be desirable to run ceiling fan 106 at a high speed and shut off light fixture 180 in order to cool the house. In the evening, it may be desirable to run ceiling fan 106 at a medium speed and turn light fixture 180 on to maintain an even temperature throughout the house and to provide illumination, respectively. At night, it may be desirable to run ceiling fan 106 at low speed and turn light fixture 180 off to maintain air circulation with a minimum of noise. If ceiling fan 106 is located at a sufficient distance above the floor, it may be necessary to use a step stool or ladder in order to reach fan mounted switches 107, 108, and 109 in order to change the speed or direction of ceiling fan 106 or the intensity of light fixture 180.

One way to overcome the disadvantages of the installation of FIG. 1 would be to install separate circuits to individual wall mounted switches for the fan speed, fan direction, and lighting control. While such an installation may be practical in new construction, in an existing home it would be necessary to remove portions of the ceiling and walls to run the additional wiring. In addition, in either new or existing construction, running additional wires involves additional expense and in some localities may require the services of a licensed electrician. Further, many ceiling fans are sold as owner-installed units with an easy to use installation kit. The complexities of house wiring are beyond the capabilities of most "do-it-yourselfers" and the length of wiring in each installation would be different, adding expense to the installation kit.

One prior art device which has been used to provide a partial solution to the above described problem of remotely controlling the operation of a ceiling fan is shown in U.S. Pat. No. 4,413,211 issued Nov. 1, 1983 to Fowler. This prior art Patent is directed towards a remote load selector which uses an existing wall switch to control a load by toggling the existing switch to provide for the selective application of power to multiple loads such as a combined ceiling fan and light fixture. The Fowler device has a number of limitations due to the fact that the user must apply power by manually operating the wall switch. For instance, the user may become confused as to which level the fan was previously switched to, making control difficult. In addition, the prior art load selector described above is generally limited in the number of control steps that can be realistically accomplished by the application and removal of power to the loads. For example, a typical ceiling fan may have three speeds in two separate directions, making a total of six different combinations of toggled signals that may be sent. If a light fixture is added to the fan, the number of combinations may be doubled to twelve. If the light fixture has more than one intensity setting, or if additional fan speeds are desired, the number of toggled combinations expands geometrically. The user may find himself toggling the wall switch repeatedly trying to find the proper combination of light intensity, fan speed, and fan direction.

Another prior art device which provides a partial solution to the above mentioned problem is the radio frequency remote control described in U.S. Pat. No. 4,548,544 to Angott. Angott shows a remote control for a ceiling fan with a hand held radio frequency transmitter and a radio frequency receiver located in the fan housing. The Angott device has the advantage in that it does not require a wall switch box, and thus may be practical in installations where a wall switch is not present. The disadvantage of the Angott unit is similar to that of the Fowler unit, in that only two switches are provided for the remote control, and thus the user must "toggle" the switches in order to switch between speeds, directions, and light intensities. Further, radio frequency controls have the disadvantage in that they are subject to electromagnetic interference and can only transmit a finite distance. If multiple fan installations are contemplated (i.e.—commercial installation, auditorium, etc.) then separate radio frequencies would be needed for each remote control in order to be able to control each fan individually.

The toggling mechanism of Fowler, the radio frequency remote control of Angott, and the prior art fan mounted controls (typically pull chain switches) all present an additional disadvantage in that it is not readily apparent to the user what speed the fan is turning when switching from one speed to the next. The fan blades are relatively large and heavy, consequently when the fan speed is changed, the fan accelerates or decelerates slowly due to the inertia of the fan blades, the mass of the moving parts of the a.c. induction motor, and the mass of the mechanism which drives the blades. This is a distinct shortcoming as the user must wait until the fan reaches the selected speed in order to determine which of the available speeds has been selected.

One prior art device which attempts to overcome the speed indication problem is that of U.S. Pat. No. 4,762,463, issued Aug. 9, 1988 to Yang. Yang uses a series of indicator lights located on the fan housing to indicate fan speed. The disadvantage of this indicator light arrangement is that the light may not be visible from the location of the wall mounted switch, and hence the user may not be able to see the indicator lights and determine what speed the fan is turning at. Further, in installations in high ceilings the indicator lights may be difficult to see without a step stool or ladder. In addition, the fan mounted indicator lights may not be aesthetically pleasing for some ornate fan designs which attempt to give the fan an historical look. The indicator lights may also be an annoyance in a bedroom installation where the lights would be quite visible to a user lying awake in bed. Finally, the Yang device does not solve the aforementioned problem of providing a fan speed and direction control combined with a lighting control at a remote location from the fan housing.

One prior art device which attempts to solve both the control and indicator problems of the devices discussed above, is the Hunter Model 22691 3-Speed Rotary Speed Control. The unit comprises a four position rotary switch and control module, packaged to replace an ordinary light switch in a standard wall box. The Model 22691 can be easily installed using existing wiring, and provides an easy to use four position switch (off, low, medium, and high). The Model 22691 rotary switch has an advantage over the Fowler device discussed above in that the rotary dial also serves as an indicator to indicate to the user what speed the fan is switched to. The disadvantage of the Model 22691 is that it cannot provide reversing control or lighting control. In fact the Model 22691 has one drawback due to the nature of the circuit design in that the fan and light cannot be used simultaneously unless the control is switched to the "high" setting.

Another prior art device which provides a partial solution to both of the aforementioned control and indication problems is shown in U.S. Pat. No. 4,719,466, issued Jan. 12, 1988 to Hart. Hart provides a remote control wall switch with three switches. One switch is a standard single pole double throw on/off switch for providing power to the fan. The other two switches are spring release toggle switches for the light and speed controls. The switches operate similarly to the device of Fowler discussed above in that the toggle switches are momentarily switched to change fan speed or light intensity. Fan direction is controlled by operating both toggle switches simultaneously. Fan speed is indicated by an audio tone generated by a tone generator located in the fan housing.

The disadvantages of the Hart device are several. First, the toggle switching technique can be confusing for the user, as the device discriminates between toggle of more than one second and less than one second. The user must have a degree of coordination in order to properly switch between speeds, light intensities, or fan directions. Further, if the user "overshoots" his desired fan speed, he must toggle through the range again, as in the Fowler device. Further, in order to ascertain the fan speed, the user must be able to hear and discern the audio tones. In applications where the fan is remotely located from the control (i.e.—auditorium) the audio tone may not be heard where the fan speed control switch is located (i.e.—backstage). In addition, background noise may obscure the audio tones, or the audio tones may themselves be a nuisance (i.e.—commercial installations in restaurants, shops, theaters, etc.). Finally, the audio tones must be discernible to the user. Those who are hearing impaired or "tone deaf" may not be able to discern what speed the fan is set at from the audio tones. Even those of perfect hearing may not be able to determine fan speed upon initial power up, as the tone may have to be compared to a previous tone to discern whether the speed is relatively high or low.

In both the Hart device and the Hunter Model 22691, the remote controls are relatively simple devices. Hart uses Silicon Controlled Rectifiers (SCRs) or Triacs to alter the zero-crossing point of the 60 Hz sinusoidal power line signal in order to communicate with a controller mounted in the ceiling fan itself. The Hunter Model 22691 uses a series of switched capacitors to alter fan speed. In all three instances, the remote controls do not contain a power supply per se, and thus cannot drive any sophisticated switching devices or displays. In the prior art devices of Hart and Fowler, the power supply is wired in parallel to the ceiling fan and located within the ceiling fan housing itself. The power supply is usually located in the ceiling fan because, as in the installation shown in FIG. 1, neutral line 104 does not pass through wall switch box 101, and hence there would be no return path for a power supply wired in parallel with ceiling fan 106 if it were located in wall switch box 101. As such, the prior art devices do not have a power supply capable of driving a sophisticated switching device or fan speed indicator, and instead rely on simple toggle switches or a battery powered radio transmitter to transmit signals to a fan mounted control.

The use of simple switching devices to control fan speed, direction and light intensity has a further disadvantage, as the user must physically be present to change fan speed, direction, or light intensity. The control devices discussed above do not have any provision for automatic control of ceiling fan 106 or light fixture 180 when the user is absent. The disadvantages of these devices is that if the user leaves ceiling fan 106 on when no one is present, ceiling fan 106 would be wasting energy. Further, when ceiling fan 106 is switched on in the evening, it may provide a comfortable breeze, however as night falls, and temperature drop, ceiling fan 106 may be circulating too much air for comfort, forcing the user to get out of bed and shut ceiling fan 106 off. In addition, it may be desirable to have light fixture 180 switched on and off occassionally if the user is not at home for several days in order to provide the appearance of occupancy and discourage burglars.

Wall mounted timer switches are generally known in the art. Such switches can be used to switch an appliance or light off after a predetermined period. The disadvantage of a simple timer switch is that it merely shuts off all power to an appliance. More sophisticated known timer switches may have an internal clock to switch an appliance on or off at predetermined intervals.

For a ceiling fan, however, it may be desirable to reduce fan speed or reverse fan direction after a predetermined amount of time in order to maintain comfort in a room. In addition it may be desirable to switch light fixture 180 independently of ceiling fan 106. Further, it may be desirable to turn ceiling fan 106 off or on, change fan speed, or change fan direction at a predetermined interval or at a predetermined temperature. A simple timer switch does not provide independent control of fan speed, direction or light intensity, nor does it provide a display of fan speed, direction or light intensity. In addition, many prior art timer switches are designed to fit a standard wall box. If a timer switch is used, an additional wall box may have to be installed in order to house a fan speed, direction and lighting control, adding additional expense and difficulty to the installation.

Security switches are also generally known in the art, either as an external "plug-in" module, or as a wall mounted switch, both of which may work in conjunction with a central controller. Security switches, known in the art, may switch an appliance on or off for predetermined intervals to give the appearance of occupancy. The disadvantage of the security switch is that one switch may switch only one load at a time. If the fan and light are to be switched independently, separate switches and wires would need be run, adding expense and difficulty to the installation. Alternately, if only the light is desired to be switched on or off, then the fan must be set by the user with its fan mounted controls to run the light only prior to programming the security switch. As in the timer switch discussed above, the security switch module generally requires a wall switch box for installation, and as such, any additional fan speed, fan direction, or light intensity control would require the installation of extra wall switch boxes, adding extra expense and difficulty to the installation.

In view of the deficiencies of the above prior art devices, it remains a requirement in the art to provide a remote control for a ceiling fan which can be easily installed using existing wiring, provide easy "intuitive" user-friendly operation, and provide a clear display to the user of fan speed, direction, and light intensity. It remains a further requirement in the art to provide a power supply for a remote control which can be powered solely from the switched load line of the fan and can power a sophisticated switching device, display or timer. It remains yet a further requirement in the art to provide automatic and independent switching operation of fan speed, fan direction, and light intensity. It remains an even further requirement in the art to provide timed independent automatic control of fan speed, fan direction, and light intensity. In addition, it remains a further requirement to provide a wireless remote control that does not necessarily rely on radio frequencies to control a particular ceiling fan and can also provide user-friendly control, display, and timed independent switching and control of fan speed, fan direction, and light intensity.

SUMMARY OF THE INVENTION

Therefore it is an object of the present invention to provide a remote control for a ceiling fan combined with a fan and light function display.

It is a further object of the present invention to provide a remote control for a ceiling fan which can communicate with a fan mounted control through the ceiling fan's a.c. power wiring.

It is a further object of the present invention to provide a remote control for a ceiling fan which can be installed using existing house wiring.

It is a further object of the present invention to provide a remote control for a ceiling fan which can be easily operated by the user. It is a further object of the present invention to provide a clear, concise, easily discernible display at the control which indicates fan speed, fan direction, and light intensity.

It is a further object of the present invention to provide a power supply for a remote control for a ceiling fan which need only be connected in series with the switched load line of the ceiling fan.

It is a further object of the present invention to provide automatic and independent switching of fan speed, fan direction, and light intensity in a ceiling fan.

It is a further object of the present invention to provide timed independent control of fan speed, fan direction, and light intensity in a ceiling fan.

It is a further object of the present invention to provide a portable, wireless remote control with a fan and light function display as well as automatic and timed control for both ceiling fan and light fixture.

The foregoing objects, as well as others which are to become apparent from the text below, are achieved in a remote control for a ceiling fan by providing a microprocessor remote control with power supply and display, communicating over a switched a.c. load line with a further microprocessor mounted in the ceiling fan itself. The remote control comprises a power supply, a microprocessor, a keyboard, an internal clock and a display. The microprocessor may be programmed by the user to switch the fan off and on at predetermined speeds and directions, for programmed time intervals. In addition, the microprocessor may be programmed by the user to turn off, change speed, change direction, or change both speed and direction, after a predetermined interval. The microprocessor may in addition be programmed by the user to turn a light fixture on or off, or to particular light intensities for a predetermined time periods. The display shows the time and programming information, as well as fan speed, direction, and light intensity. In addition, the display may have an "animated" feature, showing fan speed, direction, or light intensity.

These and other objects of the present invention will be better understood from the following detailed description of the preferred embodiment of the invention, taken in conjunction with the accompanying drawings in which similar elements in different Figures are assigned the same last two digits in their reference nu-

DETAILED DESCRIPTION

Figure 1:
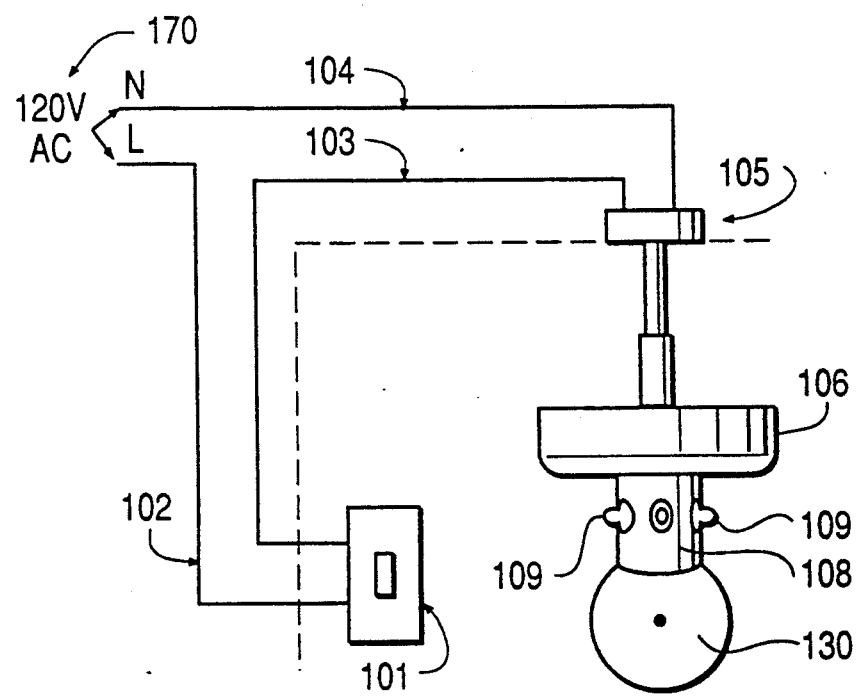
FIG. 1 shows the installation of a prior art ceiling fan using existing house wiring.
Figure 2:
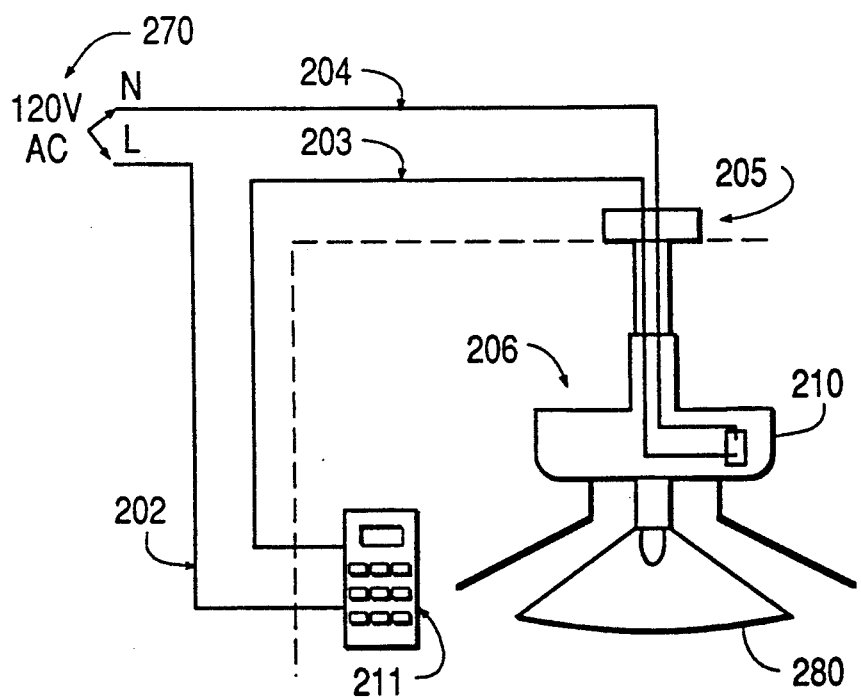
FIG. 2 shows the installation of the remote control of the present invention using existing house wiring.

Referring now to FIG. 2, wall switch 101 of FIG. 1 may be replaced with remote control 211 which may comprise a control panel, a display window, a power supply, and a transmitter (not shown). Remote control 211 may be designed to fit into and cover a typical wall switch box. Remote control 211 draws power from load line 202 which runs from circuit main 270 through remote control 211 and switched load line 203 to ceiling fan 206. The power supply, which will be discussed in connection with FIG. 9 below, requires only connections to load line 202 and switched load line 203.

Remote control 211 may switch power to switched load line 203, and in addition transmit signals over switched load line 203 to fan mounted control 210. Fan mounted control 210 contains a receiver, a control, and a switching means controlling speed and direction of ceiling fan 206 and intensity of light fixture 280. As in FIG. 1, neutral line 204 from circuit main 270 terminates in a ceiling junction box 205 where it is connected to ceiling fan 206.

The term "fan mounted" as it applies to fan mounted control 210 is defined here to be mounted in the immediate vicinity of, and electrically connected to, a ceiling fan. Fan mounted control 210 may be built in to ceiling fan 206 at the factory, or may be an aftermarket accessory kit which may be installed by the user. Some examples of locations of fan mounted control 210 would be in the housing of ceiling fan 206, in ceiling junction box 205, or in an module located between the housing of ceiling fan 206 and ceiling junction box 205 as in the device of Angott, discussed above. The fan mounted control 210 need not be physically mounted to ceiling fan 206.

Figure 3:
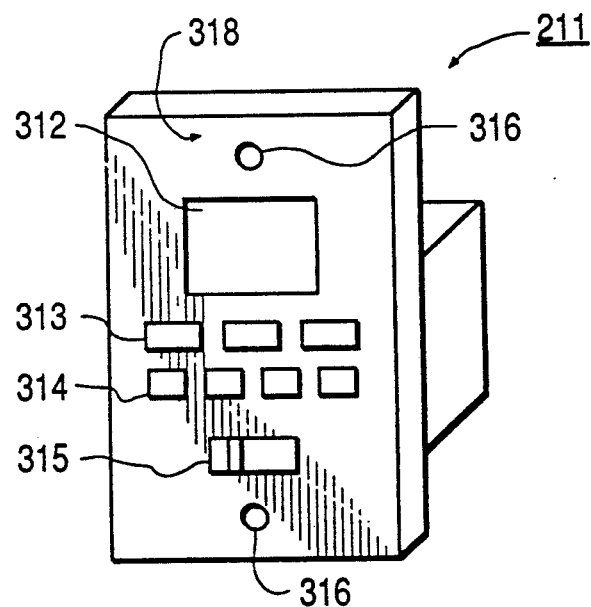
FIG. 3 shows a perspective view of the remote control and display of the present invention.

FIG. 3 shows a more detailed view of remote control 211 shown in FIG. 2. Remote control 211 may be designed to fit a standard wall switch box using two screws threaded through screw holes 316 into the wall switch box. Remote control 211 may have a display window 312, override switches 313, and programming switches 314. Remote control 211 may also have a master power switch 315 for cutting off all power to ceiling fan 206 and light fixture 280.

Figure 4:
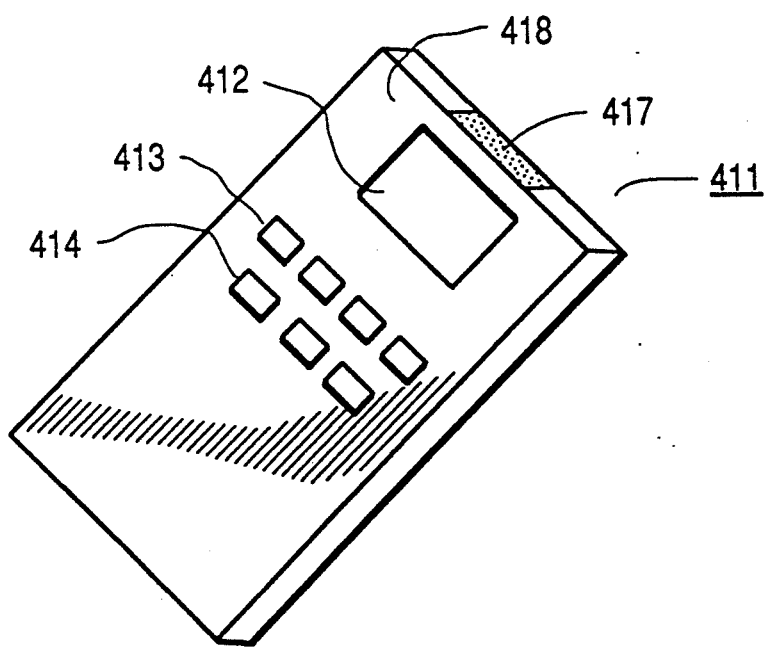
FIG. 4 shows a perspective view of the infrared control of an alternative embodiment of the present invention.

FIG. 4 shows an alternative embodiment of the present invention, an infrared remote control. Infrared remote control 411 is similar to remote control 211 except for the presence of infrared transmitter 417 and the absence of power switch 315 shown in FIG. 3. Infrared transmitter 417 may communicate with an infrared receiver mounted in a wall switch box, or with an infrared receiver mounted on ceiling fan 206. Alternately, infrared remote control 411 may work in conjunction with remote control 211 shown in FIG. 3. The infrared receiver may be installed on remote control 211 of FIG. 3, for example, behind display window 312. Commands sent from infrared remote control 411 would be received by remote control 211 and then further transmitted to fan mounted control 210 shown in FIG. 2.

Alternatively, infrared remote control 411 may communicate directly with an infrared receiver (not shown) mounted on ceiling fan 206 and coupled to fan mounted control 210 shown in FIG. 2. This direct infrared link may be especially useful in installations where no wall mounted switch box available or practical to install. Infrared interference from light fixture 280 may be reduced by the use of a 60 Hz notch filter on the infrared receiver to filter out infrared "noise" produced by heat from light fixture 280. The infrared receiver may be mounted in a position on ceiling fan 206, such as light fixture 280, where the rotating fan blades would not block the infrared signal. Alternately, the infrared signal could be timed to avoid interference from the rotating fan blades, or the signal could be made very short and transmitted repeatedly to assure that it is received by an infrared receiver mounted on ceiling fan 206 without interference from the rotating fan blades.

CONTROL PANEL

Figure 5:
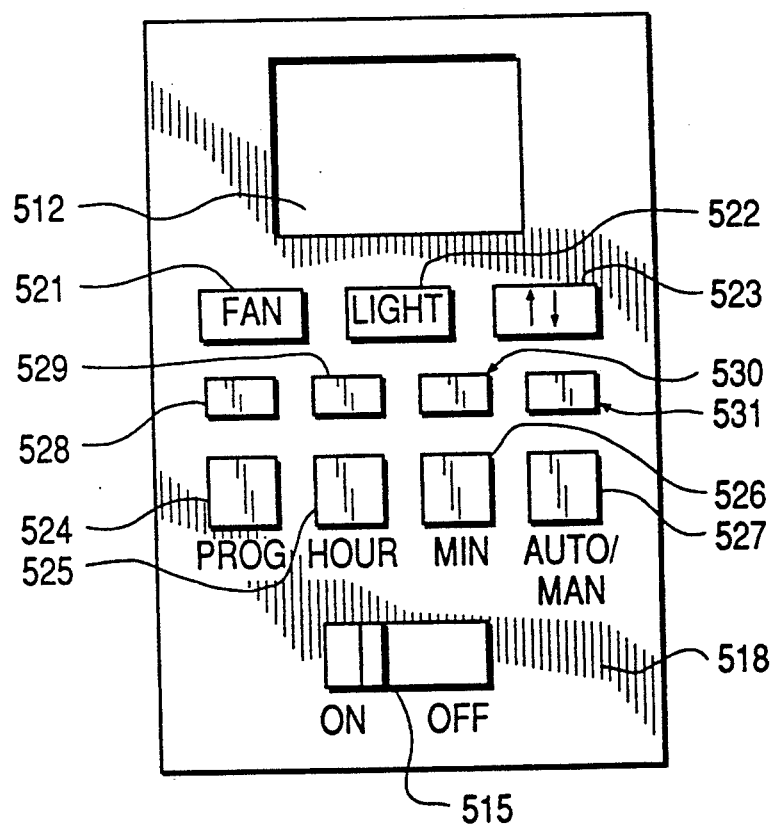
FIG. 5 shows a detailed frontal view of the remote control and display of FIG. 3.

FIG. 5 shows a more detailed drawing of control panel 318 and display window 312 of FIG. 3. Control Panel 518 contains a plurality of switches and display window 512. Display window 512 may contain a LCD, LED, plasma, CRT or other type of display. The elements of display window 512 are described in conjunction with FIGS. 11-14 below.

Main power switch 515 provides a main power cutoff for both remote control 211 as well as ceiling fan 206. If main power switch 515 is turned off for more than 10 minutes, remote control 211 may lose its memory and may have to be reprogrammed. In an alternate embodiment, a battery back-up (not shown) may be provided for the memory of remote control 515 in order to preserve the time setting and programming for longer periods of power loss.

Control panel 518 may be provided with a first row of switches comprising fan switch 521, light switch 522, and reversing switch 523. These three switches are used to control fan speed, fan direction, and light intensity manually, or may be used to program fan speed, fan direction, and light intensity for programmed operation. Control panel 518 may also be provided with an additional row of switches 528-531 for preprogrammed features such as auto-reverse and delay off. Control panel 518 may be provided with yet an additional row of switches comprising program switch 524, hour switch 525, minute switch 526, and auto/manual switch 527. Hour switch 525 and munute switch 526 are used in combination to set the clock and to program time intervals for timed operation. Program switch 524 is used to switch between regular operation and program mode. Auto/manual switch 527 is used to switch between automatic (programmed) operation and manual override mode. The detailed operation of each of the switches of FIG. 5 will be described in conjunction with FIGS. 11-14 below.

In the preferred embodiment, Switches 521-527 are push-button, momentary contact, spring-release type switches. Preferably, the switches are a low cost type membrane or rubber push button type. Main power switch 515 may be a slide or toggle type single pole, double throw switch rated to carry the entire load of ceiling fan 206 as well as power for remote control 211. Alternately, main power switch 515 could be a type of switch similar to switches 521-527 and used to switch power to a switching relay or triac which would in turn switch power to ceiling fan 206 and/or remote control 211.

BLOCK DIAGRAM

Figure 6:
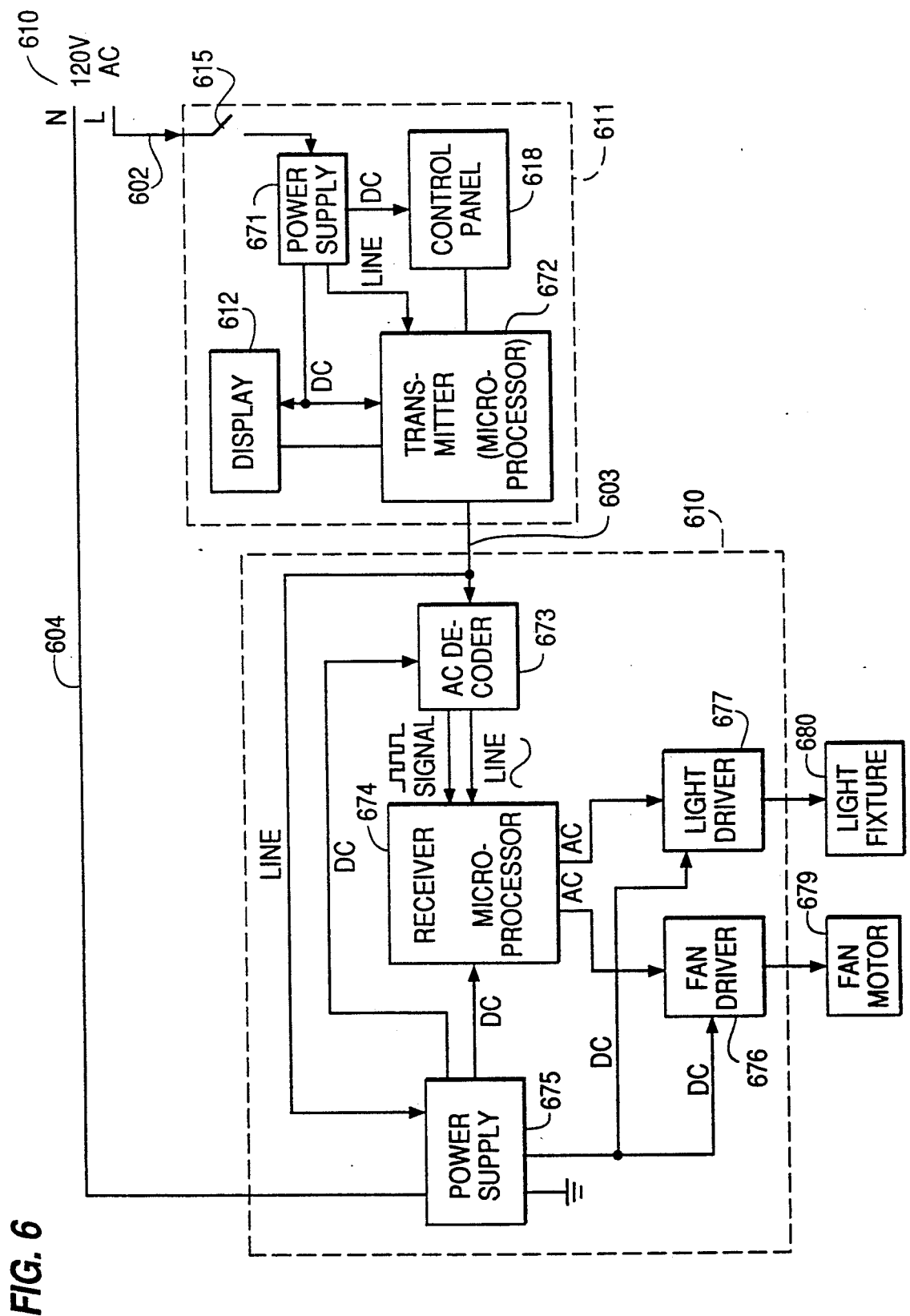
FIG. 6 shows a block diagram for the transmitter in the remote control and the receiver for the ceiling fan of the present invention.

FIG. 6 shows a block diagram of the ceiling fan control of the present invention. Load line 602 from circuit main 670 terminates in a wall switch box (not shown) and connects to remote control 611. Switched load line 603 is connected from remote control 611 to fan mounted control 610. Neutral line 604 is connected directly from circuit main 670 to fan mounted control 610.

Remote control 611 contains power supply 671, transmitter microprocessor 672, display 612, main power switch 615, and control panel 618. Note that power supply 671 is connected in series with transmitter microprocessor 672 and fan mounted control 610 through switched load line 603. Power supply 671 draws power from switched load line 603, and produces a direct current (DC) output to provide power to transmitter microprocessor 672, control panel 618, and display 612. Main power switch 615 disconnects power from both remote control 611 and ceiling fan 206, as discussed in connection with FIG. 5 above. Display 612 may display the time of day, fan speed, fan direction, and light intensity information, along with programming information as will be discussed in connection with FIGS. 11-14 below. Control panel 618 contains switches 521-527 as discussed in connection with FIG. 5 above, for accepting control and programming inputs.

Transmitter microprocessor 672 may accept control and programming inputs from control panel 618 and subsequently drive display 612. Transmitter microprocessor 672 may also store information, such as program operations, and in addition may send signals to fan mounted ceiling control 610 modulated over the 60 Hz AC power signal on switched load line 603 as will be described in connection with FIG. 7 below.

Fan mounted control 610 comprises AC decoder 673, receiver microprocessor 674, power supply 675, fan driver circuit 676, and light driver circuit 677. Switched load line 603 passes from remote control 611 to fan mounted control 610 where it connects to power supply 675 and AC decoder 673. Power supply 675 may be a conventional power supply in the sense that it may be connected to both neutral line 604 and switched load line 603 through AC decoder 673. Power supply 675 supplies DC voltage to receiver microprocessor 674, AC decoder 673, fan driver 676, and light driver 677.

AC decoder 673 receives the 60 Hz AC power signal along with the modulated control signals from transmitter microprocessor 672 over switched load line 603. AC decoder 673 decodes the control signals sent from transmitter microprocessor 672 modulated on the 60 Hz power signal over switched load line 603 and transmits the decoded signals to receiver microprocessor 674. Receiver microprocessor 674 is programmed to interpret signals sent from transmitter microprocessor 672 and control fan motor 679 and light fixture 678 accordingly.

Transmitter microprocessor 672 and receiver microprocessor 674 may be any one of a number of microprocessors known in the art. In the preferred embodiment, the transmitter microprocessor 672 may comprise a NEC PD7502 and the receiver microprocessor 674 may comprise a National Panasonic MN1551.

Fan motor 679 is switched by fan driver 676. Fan driver 676 may be a series of triacs, typically three, one for each fan speed, along with a reversing relay. Receiver microprocessor 674 controls the triacs in fan driver 676 to switch on various windings in fan motor 679, or alternately control fan speed by switching a series of speed control capacitors into the circuit. Receiver microprocessor 674 may be programmed to control the reversing relay for reversing power to fan motor 679. When a reversing signal is received by receiver microprocessor 674, receiver microprocessor 674 will shut off all power to fan motor 679 for one second to allow the speed control capacitors to discharge, then switch the reversing relay and reapply power to fan motor 679. The time delay is necessary in order to prevent the stored charge in the speed control capacitors from arcing the contacts of the reversing relay.

In an alternate embodiment, fan driver 676 may comprise a variable speed control, typically by phase controlled triac, to provide an infinitely variable speed control for fan motor 679. In the preferred embodiment, a three speed control is used, as present low cost frequency inverters today tend to reshape the sinusoidal shape of the 60 Hz power signal and subsequently cause excessive fan noise.

Light Driver 677 may be silicon controlled rectifier (SCR) which provides an infinitely variable lighting intensity control (i.e.—dimmer) for light fixture 680. In alternate embodiments, light driver 677 may have a discrete series of lighting intensities (i.e.—low, medium and high) or may be a triac or relay used for a simple on/off control.

In the above embodiments, both transmitter microprocessor 672 and receiver microprocessor 674 are characterized as being microprocessors, however, it is envisioned that one or both of the microprocessors could be replaced with other types of controls, such as combinational logic circuits (i.e.—TTL). Further, the programming features are described above as being stored and executed in transmitter microprocessor 672 with receiving microprocessor 674 performing the switching and control operations. However, it is envisioned that programming commands may be transmitted directly to receiving microprocessor 674 and the programming stored and executed there. Further, it is envisioned that bidirectional communication between the transmitter microprocessor 672 and receiver microprocessor 674 may be used. Such bidirectional communication may be used for transmitting acknowledgment signals, service signals (i.e.—fan motor overheat, bulb burnt out, etc.), temperature signals, or other information from the receiver microprocessor 674 to the transmitter microprocessor 672.

DATA TRANSMISSION

Figure 7:
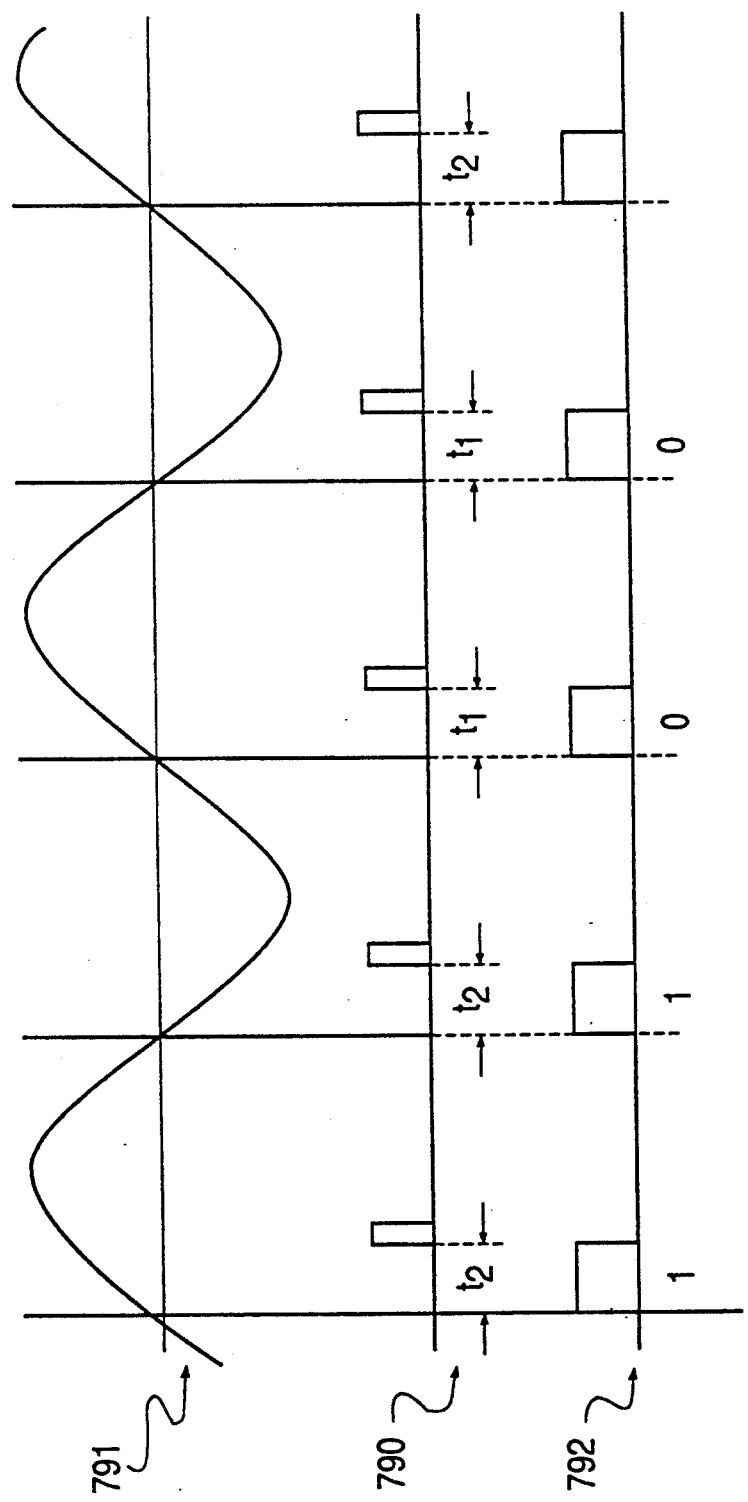
FIG. 7 shows examples of signals transmitted between the remote control transmitter and the fan mounted receiver.

FIG. 7 shows an example of signals transmitted between the transmitter microprocessor 672 and receiver microprocessor 674. A typical command signal 790 sent from the transmitter microprocessor 672 to the receiver microprocessor 674 may comprise a 7 bit digital signal. The first bit of each signal may always be a 1, while the next three bits may be the particular command code bits. The fifth bit may be a parity bit and would always be a 1. The last two bits may be each be 0, indicating the end of the coded signal. In this instance, only three bits are used for command signals, making a possible $2^3$ combinations of bits, or a possible 8 commands. Additional commands may be used by adding additional bits to the command signal.

In a ceiling fan, however, there are a limited number of control signals that may be desirable. An example of such control signals may be:

| Signal | Command |
|--------|---------|
| 000 | Fan Off |
| 001 | Reverse Fan Direction |
| 010 | Decrease Fan Speed |
| 011 | Increase Fan Speed |
| 100 | Light On |
| 101 | Light Off |
| 110 | Increase Light Intensity |
| 111 | Decrease Light Intensity |

In such an embodiment, the ceiling fan may be turned on by sending either "Increase Fan Speed" or "Decrease Fan Speed" signals from the transmitter microprocessor 672 to the receiver microprocessor 674.

In an alternate embodiment, additional bits may be used to send individual signals for each discrete fan speed, as well as a "Fan On" signal. Similarly, as described above in connection with FIG. 6, the keyboard commands could be sent directly to the receiver microprocessor 674 without prior interpretation by a transmitter microprocessor 672. In such an embodiment, for example using the control panel of FIG. 5 with 11 switches 521-531, 4 command bits would be necessary to transmit a discrete signal for each switch of the control panel to the receiver microprocessor 674 ($2^4$ or 16 combinations of bits). In such an embodiment, the transmitter microprocessor could be replaced by a combinational logic circuit and all programming functions would be carried out by receiver microprocessor 672.

Returning to FIG. 6, command signal 790 shows the first five bits of a command 100 (Fan On), with the last two bits (bits 6 and 7) omitted for clarity. As discussed above, bits 6 and 7 may always be a pair of 0's to indicate the end of command signal 790. Each bit of command signal 790 is coded and transmitted every half cycle by a pulse from transmitter microprocessor 672. The timing of each pulse from the zero crossing point of the AC signal determines whether the bit is a 0 or a 1. In command signal 790 shown, if the time between the zero crossing of the 60 Hz AC signal and the pulse is $t_1$, then the bit is a 0 and if the timing between the zero crossing of the 60 Hz AC power signal and the pulse is $t_2$, then the bit is a 1. In FIG. 7, $t_1$ is shown as being slightly less than $t_2$, however, different configurations are possible. Generally, any time period may be chosen so long as $t_1$ and $t_2$ are in the range from 0 mS to approximately 4 mS (one quarter of the 60 Hz wavelength) and the difference in the time periods $t_1$ and $t_2$ is discernible to the receiver microprocessor 674. Signal 791 shows how the 60 Hz AC power signal transmitted over switched load line 603 between transmitter microprocessor 672 and receiver microprocessor 674 would appear with command signal 790 superimposed.

Signal 791 is received by the fan mounted control 610 of FIG. 6, and the command signal 790 is stripped off in AC decoder 673. The resulting signal received by receiver microprocessor 674 is shown in FIG. 7 as received signal 792. The receiver microprocessor 674 then measures the pulse width of each received signal to determine whether it is a 0 or a 1. Each command signal 790 is transmitted four times by transmitter microprocessor 672 and must be received correctly four times in sequence by receiver microprocessor 674 before a command is executed. Since two bits may be transmitted by transmitter microprocessor 672 every full wave cycle of the 60 Hz power signal, each command signal 790 would take slightly less than a quarter of a second to be transmitted four times between transmitter microprocessor 672 and receiver microprocessor 674.

Of course, other methods of coding may be used to transmit the command signal 790. Additional bits may be used, as discussed previously, and other types of parity checking and/or bit correcting techniques may be used in order to insure data integrity. In addition, other forms of modulation are envisioned for transmitting the command signal 790 over the AC power line. As in the Hart device discussed in the prior art, for example, the zero crossing point of the 60 Hz AC power signal may be altered to transmit a signal. The crossing point of the leading edge of a half waveform may be delayed to indicate a 0 bit, and the crossing point of the trailing edge of a half waveform may be advanced to indicate a 1 bit. Other methods of modulating the signal are envisioned as well, as would be appreciated by one skilled in the art.

Figure 8:
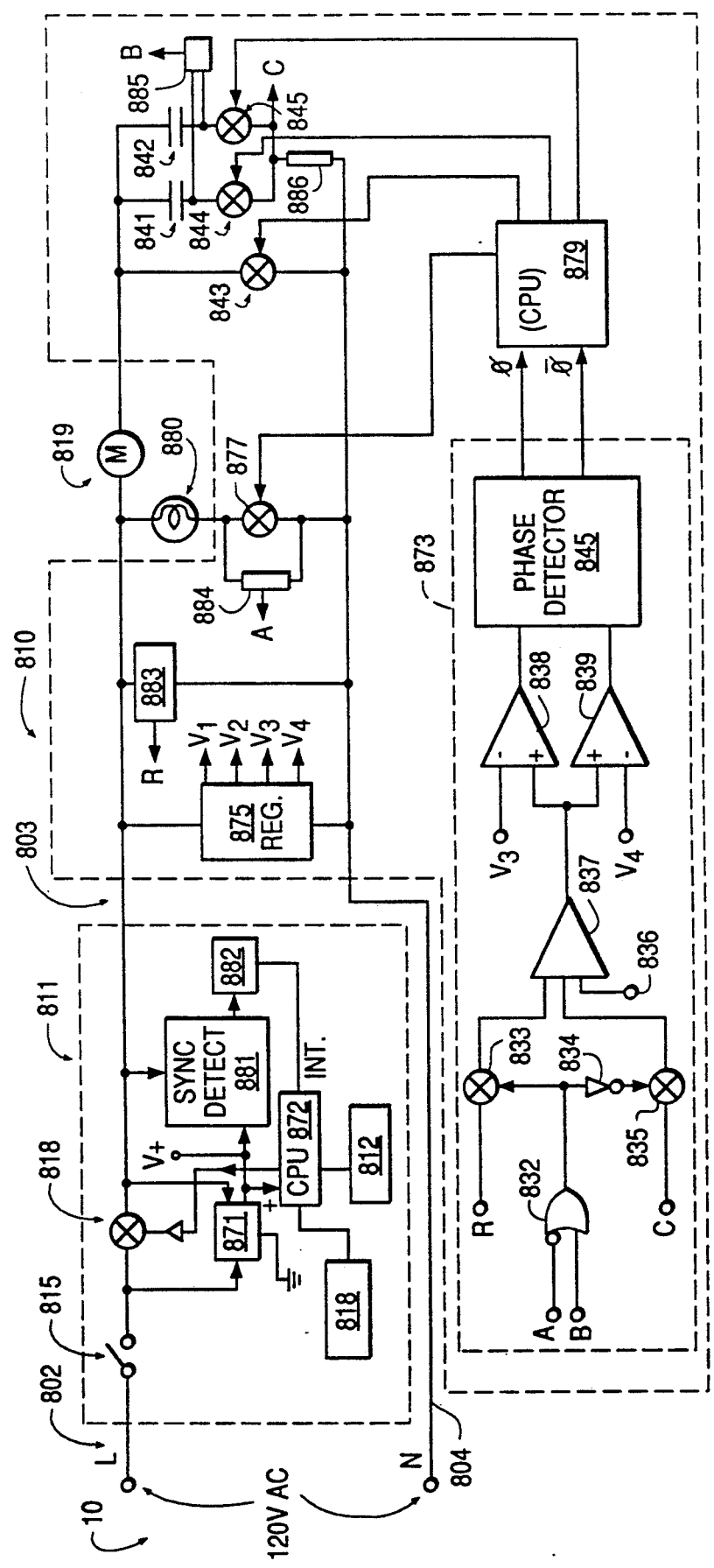
FIG. 8 shows a more detailed block diagram of the transmitter and receiver of FIG. 6.

FIG. 8 shows more detail of the block diagram of FIG. 6. Load line 802 provides AC current from circuit main 870 to main power switch 815 of remote control 811. When main power switch 815 is closed, current passes through triac 878. Triac 878 may be continuously driven by transmitter microprocessor 872. The slight voltage drop across triac 878 is tapped by power supply 871, rectified, regulated, and output as voltage V+ which provides power to transmitter microprocessor 872, display 812, control panel 818 and synchronous detector 881. Synchronous detector 881 detects the 60 Hz sinusoidal waveform of the AC power signal. The detected waveform is passed from synchronous detector 881 to waveform shaper 882. Waveform shaper 882 outputs a 60 Hz square wave synchronized with the 60 Hz AC power signal which acts as an interrupt to the transmitter microprocessor 872. The interrupt signal is used by the transmitter microprocessor 872 to synchronize the command signals sent to the receiver microprocessor 874 with the 60 Hz AC power signal.

The 60 Hz AC power signal and command signals are transmitted over switched load line 803 to fan mounted control 810. Power supply 875 is connected in parallel to switched load line 803 and neutral line 804, and rectifies, regulates and outputs voltages $V_1$, $V_2$, $V_3$ and $V_4$ to the various components of fan mounted control 810.

Voltage sensor 883, also connected in parallel between switched load line 803 and neutral line 804, senses the voltage drop across switched load line 803 and neutral line 804 and outputs a reference signal R representative of the 60 Hz AC signal and command signal pulses as will be discussed below. Similarly, sensors 884, 885, and 886 are used to output signals to AC decoder 873 to adjust the reference voltage when detecting command signal pulses. Sensor 884 senses the voltage drop across light fixture control SCR 877 and outputs a binary logic signal A indicative of whether lighting fixture 880 is on or off (light on=0, light off=1). Sensor 885 outputs a binary logic signal B indicating whether fan speed control capacitors 841 and 842 have been switched into the fan circuit (capacitors in circuit=0, capacitors out of circuit=1). Sensor 886 outputs an analog signal C which is a function of the current passing through speed control capacitors 841 and 842. These various sensed signals are necessary in order to be able to detect the command pulses from the transmitter microprocessor 811. When the load of the fan motor 879, or light fixture 880 is altered, there will necessarily be some disruption in the 60 Hz AC power signal due to the nature of the loads and the switching triacs. The resultant signals R, A, B, and C from sensors 883, 884, 885 and 886, respectively, are input to AC decoder 873 to select the reference voltage used when detecting the command signals.

AC decoder 873 comprises OR gate 832, transistors 833 and 835, inverter 834, pulse detector 837, offset voltage 836, differential amplifiers 838 and 839, and phase detector 845. Binary signals A and B are input to OR gate 832 with signal A inverted. The output of OR gate 832 will be low only when A is high and B is low (i.e.—light fixture 880 is off and fan motor 879 is operating at low or medium). The effect of the OR gate and inverter 834 is to select reference voltage C for pulse detection if light fixture 880 is off and fan motor 879 is operating at low or medium speed. In all other cases, the reference voltage will be chosen as R. Reference voltage C compensates for the disruptions to the 60 Hz AC power signal caused by the load of the switching capacitors and fan motor 841, 842 and 879, respectively.

Reference voltage R or C will pass through its appropriate switching transistor 833 or 835, respectively, to pulse detector 837, which offsets the reference voltage R or C with offset voltage 836, a 60 Hz sine wave, and outputs a series of pulses to the (+) terminal of differential amplifiers 838 and 839. Differential amplifiers 838 and 839 have at their (−) inputs voltages $V_3$ and $V_4$ respectively, and act as a phase detector to detect the (+) and (−) phases of the pulse signals. The signal from the phase detector is sent to receiver microprocessor 874 for processing.

Receiver microprocessor 874 identifies the command signal and triggers the appropriate triac or SCR. Light fixture control triac 877 acts as a light dimmer for light fixture 880. Triac 843 is the fan high speed triac, and will switch fan motor 879 directly into the line current. Triac 844 is the fan medium speed triac, and will switch fan motor 879 on through medium speed control capacitor 841. Triac 845 is the fan low speed triac, and will switch fan motor 879 on through low speed control capacitor 842.

Figure 9:
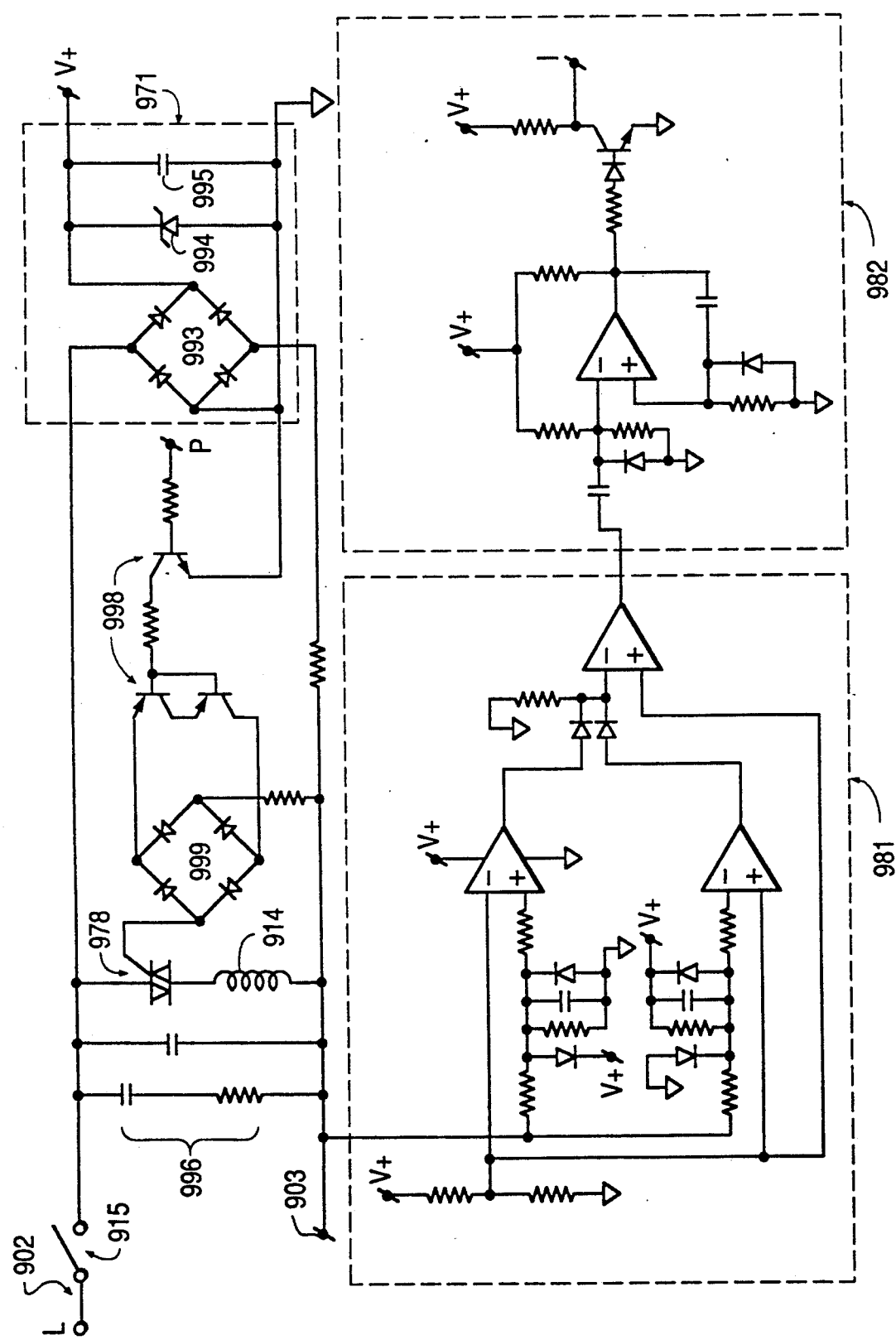
FIG. 9 shows a schematic of the transmitter of FIG. 6.

FIG. 9 shows a more detailed schematic of a portion of transmitter circuit 811 of FIG. 8, with transmitter microprocessor 872, display 812, and control panel 818 omitted for clarity. Power from the circuit main (not shown) is input to load line 902 and passes through main power switch 915. Triac 978 is placed in series with the switch load line 903 which is further connected to the ceiling fan (not shown). Parallel to triac 978 is RC filter 996 which filters out any line noise present in the 60 Hz AC signal. Signal P from transmitter microprocessor (not shown) drives transistor 998, switching on triac 978 through full-wave rectifier 999.

Power supply 971, taps the voltage drop across triac 978 and choke coil 914, rectifies the signal in full-wave rectifier 993, regulates and filters the signal in zener diode 994 and capacitor 995, and outputs supply voltage V+ which supplies the transmitter microprocessor (not shown), display (not shown), control panel (not shown), sync detector 981, and wave shaper 982.

As discussed in conjunction with FIG. 8 above, sync detector 981 detects the 60 Hz sinusoidal power signal and outputs a signal to wave shaper 982. Wave shaper 982 outputs a signal I which is synchronized with the 60 Hz AC power signal and acts as an interrupt to transmitter microprocessor (not shown).

Figure 10A:
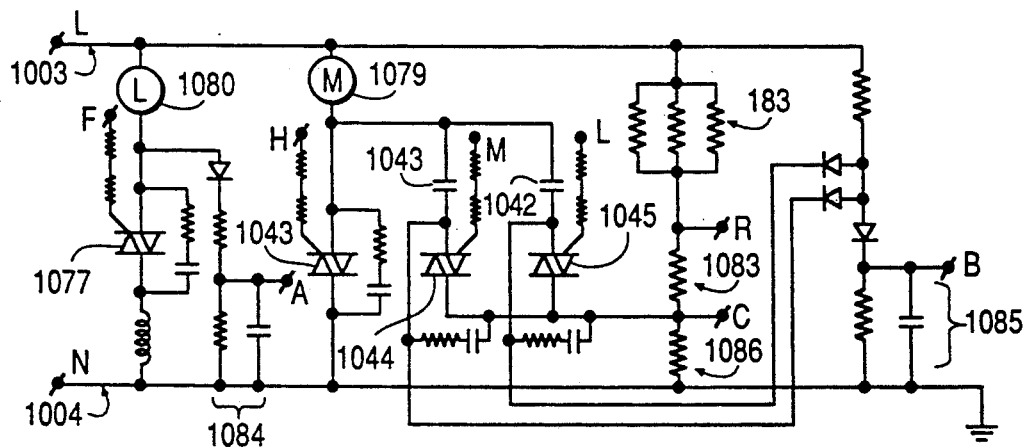
FIGS. 10A and 10B show a schematic of the receiver of FIG. 6.
Figure 10B:
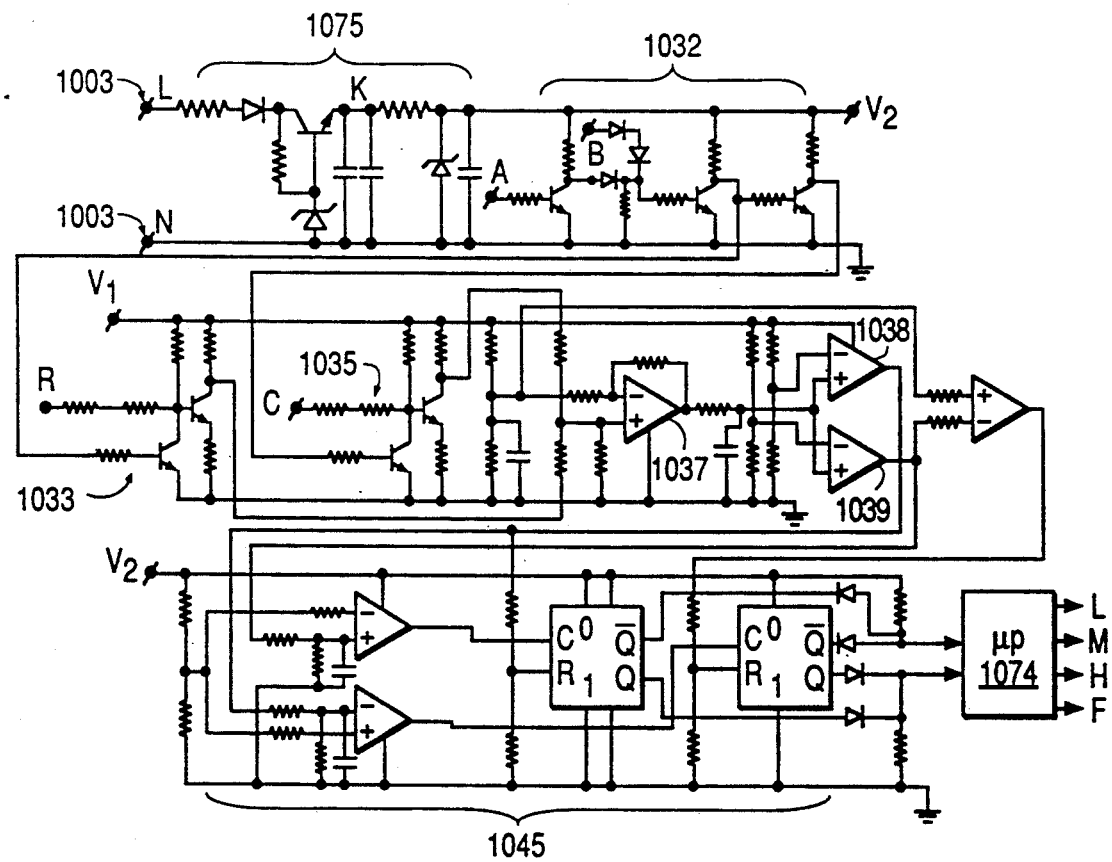

FIG. 10 shows a more detailed schematic of the fan mounted control 810 of FIG. 8. The upper portion of FIG. 10 shows the fan motor 1079 and light fixture 1080 and their associated switching circuits. Signal L drives triac 1045 to run the fan motor 1079 through speed control capacitor 1042 at low speed. Signal M drives triac 1044 to run the fan motor 1079 through speed control capacitor 1043 at medium speed. Signal H drives triac 1043 to run the fan motor 1079 directly from switched load line 1003 at high speed. Signal F drives light fixture control triac 1077 to control the intensity of light fixture 1080.

Sensor 1084, similar to Sensor 884 discussed in connection with FIG. 8 above, comprises a diode, a voltage divider and capacitor, and outputs a binary signal indicating whether light fixture 1080 is off. If triac 1077 is at least partially conducting, then no current will pass through sensor 1084 and the output signal A will go low. If triac 1077 is off, a small amount of current will pass through light fixture 1080 and sensor 1084 and output signal A will go high.

Sensor 1085, similar to Sensor 885 discussed in connection with FIG. 8 above, comprises a diode, a voltage divider and capacitor, and outputs a binary signal indicating whether fan motor 1079 is switched through either of speed control capacitors 1043 and 1042. If either triac 1044 or 1045 are at least partially conducting, then no current will pass through sensor 1085 and the output signal B will be pulled low. If both triac 1044 or 1045 are off, current will pass through sensor 1085 and output signal B will go high.

Voltage sensor 1083 acts as a voltage divider and outputs a signal R which is a function of the line voltage across load line 1003 and neutral line 1004. Attenuated motor current sensor 1086 outputs a signal C which is a function of the current passing through speed control capacitors 1043 and 1042. As discussed in FIG. 8 above, signal C is used to detect command signal pulses only when light fixture 1080 is switched off and fan motor 1079 is operating at medium or low speeds.

The lower half of FIG. 10 shows the power supply 1075, logical OR gate 1032, switching transistor circuits 1033 and 1035, pulse detector amplifier 1037, differential amplifiers 1038 and 1039, and phase detector circuit 1045. As discussed above, the output of phase detector circuit 1045 is input to receiver microprocessor 1074 to decode the command signal and drive the fan motor 1079 and light fixture 1080 with output signals L, M, H, and F.

Power supply 1075 is a typical half-wave rectified power supply with diode rectification, a power transistor, a zener diode for voltage control, and a filter capacitor. OR gate 1032 uses inputs A (inverted) and B and outputs a low signal only when A is high and B is low. The output of OR gate 1032 drives switching transistors 1033 and 1035 to select the appropriate reference signal R or C. The reference signal is then passed through pulse detector 1037 and differential amplifiers 1038 and 1039. The output of differential amplifiers 1038 and 1039 is passed through phase detector 1045 which detects whether each pulse is a binary "0" or "1". The output from phase detector 1045 is input to microprocessor 1074 which interprets the command signal and outputs the appropriate combination of signals L, M, H, or F.

Not shown in FIG. 10 is the reversing relay and accompanying control circuitry. As can be easily understood by one skilled in the art, the reversing relay may be connected to the electrical leads of fan motor 1079 and be a double pole, double throw type of relay designed to alter the power connections of the main or start winding of fan motor 1079 and thus change the direction of fan rotation. The coil of the reversing relay can be driven directly from a voltage signal generated by receiver microprocessor 1074, or preferably may be driven through an intermediary triac in order to shield receiver microprocessor 1074 from the inductive load of the reversing relay coil. In an alternate embodiment, the reversing relay may be entirely replaced by a series of triacs, each switching a different portion of the windings of fan motor 1079. As discussed in connection with FIG. 6 above, receiver microprocessor 1074 is programmed to shut off power from triacs 1043, 1044 and 1045 for one second before engaging the reversing relay in order to discharge any voltage stored in speed control capacitors 1043 or 1042 and prevent arcing of the contacts of the reversing relay.

DISPLAY

Figure 11:
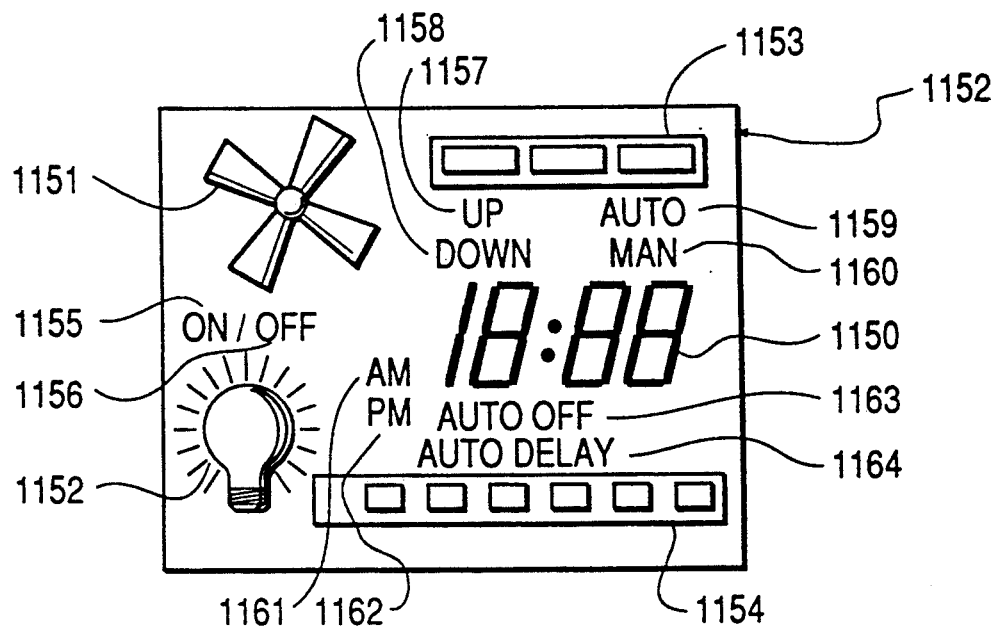
FIG. 11 shows a detailed view of the display of FIG. 5 upon initial power up.

Upon initial installation, or after an extended power failure, display 512 will appear as shown in FIG. 11. The entire LCD (or other type) display may flash on and off to indicate to the user that a power failure has occurred and the clock along with any programs must be reset. All of the elements of the display may flash simultaneously. Display 1112 may comprise fifteen separate elements. Clock display 1150 generally displays the time, however, upon initial power up or after an extended power failure, clock display 1150 may flash 18:88 to test the operation of all of the LCD elements in clock display 1150. Clock display 1150 is used to display the time of day to the user, and is also used in programming remote control 211, as will be described below.

Figure 13:
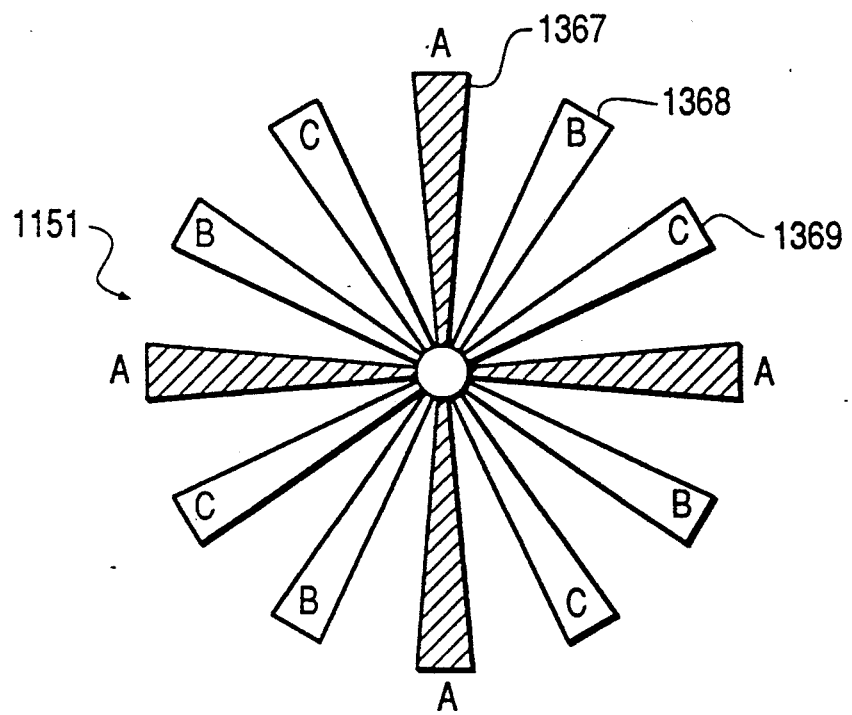
FIG. 13 shows a detailed view of the animated fan display.
Figure 14:
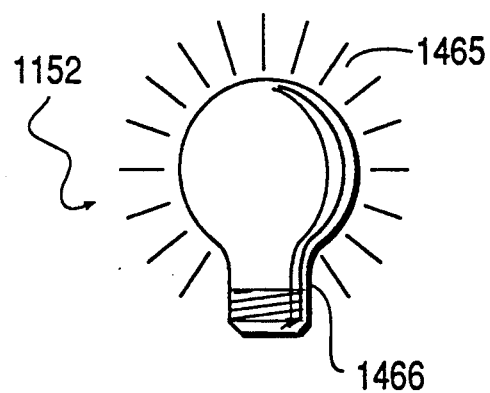
FIG. 14 shows a detailed view of the animated light display.

Animated ceiling fan display 1151 provides a pictorial representation of a ceiling fan as it would appear to the user. FIG. 13 shows a more detailed view of animated ceiling fan display 1151 of FIG. 11. Animated ceiling fan display 1151 may consist, for example, of twelve blade elements divided into three groups of four, one element of each group A, B and C represented here by elements 1367, 1368 and 1369, respectively. The animated effect of animated ceiling fan display 1151 uses the phenomena of persistence of vision to produce a pictorial display of a fan which appears to be rotating. When ceiling fan 206 is rotating in a clockwise direction, elements of group A will be displayed for approximately one-quarter second while elements of groups B and C are off. Elements of group B will then be displayed for the next quarter second while elements of groups A and C are off. Next, elements of group C will be displayed for a quarter second while elements of groups A and B are off. The cycle will then repeat itself as long as the fan is on.

The effect of the display is to give the appearance of rotation to animated ceiling fan display 1151 and allow the user to determine at a glance whether ceiling fan 206 is moving and, if so, in what direction. If ceiling fan 206 is rotating counterclockwise, then the display sequence will be reversed. Alternately, time periods other than one-quarter second may be used. For example, in a further embodiment of the present invention, the time period may be altered with fan speed (shorter time periods for faster fan speeds, longer time periods for slower fan speeds) to simulate fan speed as well as direction in the animated ceiling fan display. The number of elements in the display may be more or less than twelve. More elements may provide a more realistic looking animation sequence, while fewer elements may produce a passable animation effect at reduced cost. Further, the number of elements may by changed to match the number of fan blades on the ceiling fan. A five-bladed ceiling fan may have fifteen elements in three groups of five. Similarly, a three-bladed fan may use nine elements in three groups of three. Animated ceiling fan display 1151 may be designed to accommodate any one of a three-, four-, or five-bladed fan by programming remote control 211 to display the appropriate number of blades in animated ceiling fan display 1151. Animated ceiling fan display 1151 is an easy to read display and has particular application in installations where ceiling fan 206 cannot be viewed from the location of remote control 211 (i.e.—commercial installations or large rooms).

Figure 12:
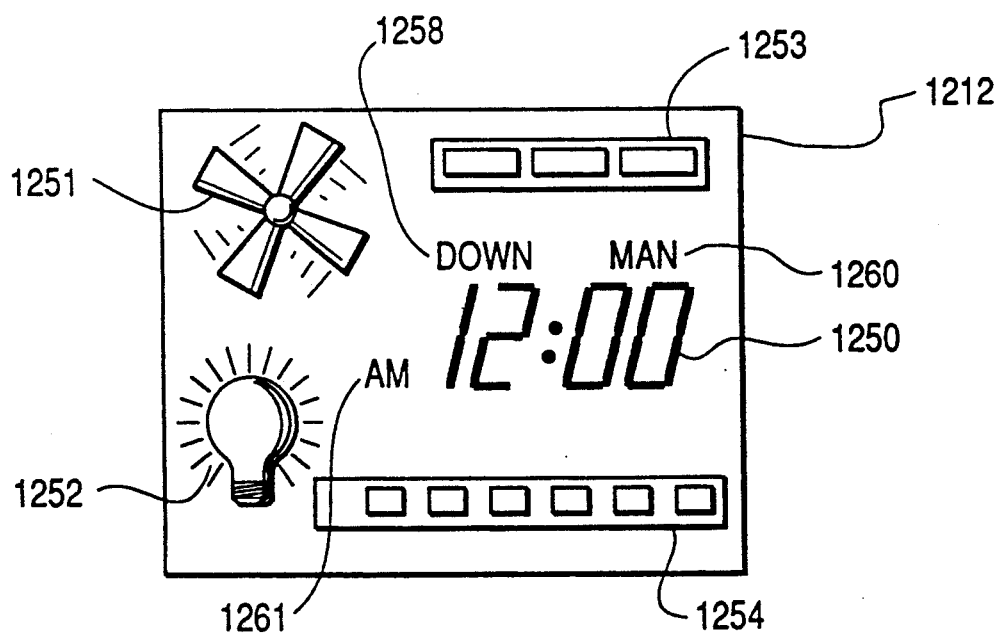
FIG. 12 shows a detailed view of the display of FIG. 5 in the default mode.

Animated light display 1152 is a pictorial representation of a light bulb and a series of rays emanating from the bulb. FIG. 12 shows a detailed view of animated light display 1152 shown in FIG. 11. Animated light display 1152 consists of bulb 1466 and rays 1465. When light fixture 280 in ceiling fan 206 is lit, bulb 1466 may be displayed and rays 1465 will flash on and off at, for example, one second intervals. In other embodiments, animated light display 1152 may be dimmed according to light intensity, or the number of rays displayed or the frequency of flashing may be altered as a function of light intensity.

The effect of animated light display 1152 is to provide the user with an easy to read display indicating status of light fixture 280. Such a display is especially useful in installations where light fixture 280 is not visible from the location of remote control 211.

Fan speed display 1153 may provide a more precise indication of fan speed to the user than animated fan display 1151. In the three speed embodiment shown in FIG. 11, fan speed display 1153 consists of three indicators, one for each fan speed. When ceiling fan 206 is off, no indicators are displayed. One indicator may be displayed for low speed, two for medium speed, and three for high speed. Fan speed display 1153 may be located adjacent to, and used in conjunction with, animated fan display 1151. Fan speed display 1153 may provide the user with a more concise indication of fan speed than can be determined from a precursory view of animated ceiling fan display 1151. Three indicators are shown here for a three speed fan, however, it is envisioned that a smaller or larger number of indicators may be used for a fan with fewer or greater number of speeds. For a infinitely variable speed fan, a plurality of small indicators may be used to provide an approximate indication of fan speed, or alternately, a smaller number of indicators (such as the three shown here) may be used to indicate the approximate range of the fan speed (low, medium, or high).

Light intensity display 1154 provides a more accurate indication of light intensity to the user than animated light display 1152. In the embodiment shown, the six elements of light intensity display could be used for a six level lighting control, or an infinitely variable (i.e.—dimmer) light control. In a six level embodiment, no elements may be displayed when light fixture 280 is switched off and one additional element may be displayed for each successive level of light intensity, with six elements displayed for full light intensity. In an infinitely variable lighting control, no elements may be displayed when the lighting fixture is switched off. The first element may be displayed when lighting fixture 280 is switched in the range from "just on" to one-sixth intensity. Both the first element and the second element may be displayed when lighting fixture 280 is switched in the range of one-sixth intensity to one-third intensity. Similarly, additional elements may be displayed as light intensity increases, with all elements displayed when lighting fixture 280 is switched in the last range of five-sixths intensity to full intensity.

It is anticipated that more or less than six elements may be used for light intensity display 1154. For example, in a three light intensity level embodiment, only three elements need be used. In a single level embodiment (i.e.—on/off) only one element may be used. In an alternate embodiment of an infinitely variable light control display, each element of light intensity display 1154 may be individually dimmed from low to high intensity as light fixture 280 is controlled through that range. The effect of such an embodiment, would be to give a finer indication of light intensity when light fixture 280 is switched to a position in the middle of a particular range for that indicator element.

The remaining display elements are fairly self explanatory. On indicator 1155 and off indicator 1156 are used to display on and off times during the programming process described below. In addition, on indicator 1155 and off indicator 1156 could be used to indicate the status of the ceiling fan 206 and/or light fixture 280. Up indicator 1157 and down indicator 1158 are used to indicate the direction of rotation of the ceiling fan (i.e.—updraft or downdraft) either at the present time, or during the programming process described below. Auto indicator 1159 and manual indicator 1160 indicate whether remote control 211 is presently in the automatic mode (programmed operation) or manual override mode. AM indicator 1161 and PM indicator 1162 indicate the time of day (morning versus evening) either at the present time, or during the programming process described below. Auto off indicator 1163 and auto delay indicator 1164 indicate whether these features have been enabled.

In addition to the indicators listed above, other indicators may be used as well, for additional program features (such as auto reverse) or for additional control elements. In one embodiment, programmable features may be represented by individual arrows pointing to various menu selections printed on the surface of control panel 518. Such an embodiment allows the control to be tailored to individual applications without the expense of redesigning display 512. Further, it is envisioned that fewer display elements may be necessary for a remote control with fewer features. For example, a remote control without the programmable features may comprise only fan speed, direction, and light intensity displays 1151-1154. Similarly, ceiling fans without light fixtures 280 may not require the light fixture display elements 1152-1154.

OPERATION

The operation of remote control 211 will now be explained in conjunction with FIG. 5 and FIGS. 11-22. Remote control 211 is designed to be "intuitive", that is, easy to operate for the user. Various switches 512-527 of FIG. 5 are labeled as to their function, and the operation of each feature should be familiar to a user who is used to programming a digital timer, a programmable thermostat, or a VCR.

Upon initial power up, or after an extended power interruption, display 1112 of FIG. 11 may flash to indicate to the user that a power interruption has occurred and the time and programs are not set. If any switch 521-527 of control panel 518 of FIG. 5 is subsequently pressed, the flashing will cease, remote control 211 will turn to a "default" mode and display 512 of FIG. 5 will appear as shown in display 1212 in FIG. 12. In the default mode, clock display 1212 may reset to 12:00 AM and commence keeping time. Ceiling fan 206 may turn on in a downdraft (counterclockwise) direction at high speed, and animated ceiling fan display 1251 will commence "rotating" in a counterclockwise direction as shown in FIG. 12. Fan speed indicator will indicate full speed, and downdraft indicator 1258 will be displayed. Lighting fixture 280 (if present) may turn on to full intensity and animated light display 1252 will be displayed along with its associated flashing "rays" and light intensity indicator 1254 will indicate full intensity. Manual mode indicator 1260 will be displayed indicating that remote control 211 is in manual override mode.

To set the correct time, the user presses hour switch 525 of FIG. 5 until the hour portion of clock display 1250 is set correctly. If hour switch 525 is held down, the hour portion of clock display 1250 of FIG. 12 will increment through a 24 hour cycle (1-12 AM, and 1-12 PM) until hour switch 525 is released. The minute portion of clock display 1260 may be adjusted by pressing minute switch 526 until the correct minute reading appears. If minute switch 526 is held down, the minute portion of clock display 1260 will cycle through a 60 minute cycle until minute switch 526 is released.

Fan switch 521 is used to switch ceiling fan 206 off and on manually, as well as change the speed of ceiling fan 206. If ceiling fan 206 is initially off, momentarily pressing fan switch 521 will turn ceiling fan 206 on. Ceiling fan 206 will turn on to the speed and direction that ceiling fan 206 was turning at when last shut off. When remote control 211 is first installed, or if power is interrupted, ceiling fan 206 will turn on to the default mode, high speed in the downdraft (counterclockwise) direction. Once ceiling fan 206 is turned on, momentarily pressing fan switch 521 again will turn ceiling fan 206 off again. Remote control 211 will "remember" fan speed and direction last used and will run ceiling fan 206 at that speed and direction when fan switch 521 is momentarily pressed again.

Fan switch 521 can also be used to manually change fan speed. When ceiling fan 206 is running, fan switch 521 may be pressed and held down and ceiling fan 206 will slowly "cycle" through its available speed settings. Preferably, there are three ceiling fan speeds, however, any number of speeds are possible including an infinitely variable speed control. When ceiling fan 206 reaches the setting desired by the user, as indicated to the user by fan speed display 1253, fan switch 521 may be released and ceiling fan 206 will stay at that speed. Fan switch 521 may also be used in conjunction with some of the programmable features which will be described below.

Light switch 522 works in a similar manner to fan switch 522 described above. When light switch 522 is momentarily pressed, light fixture 280 may be switched on or off. A plurality of different light intensity settings are available, or light fixture 280 may have an infinitely variable intensity adjustment (i.e.—dimmer). In the preferred embodiment, light fixture 280 may have an infinite number of intensity settings (i.e.—dimmer). When light switch 522 is pressed and held down, remote control 206 will slowly increase light intensity, starting at the present setting and increasing to full intensity, at which point it will shut off and start increasing again. Remote control 206 will continue to cycle the light intensity setting until light switch 522 is released at which point light fixture 280 will remain at that setting. Light fixture 280 can be turned off by momentarily pressing light switch 522 again. Remote control 211 will "remember" the intensity setting of light fixture 280 and will turn on to that intensity when light switch 522 is momentarily pressed again.

Reversing switch 523 works differently than both fan switch 521 and light switch 522. If reversing switch 523 is pressed while ceiling fan 206 is running, remote control 211 will send a signal to fan mounted control 210 to reverse fan direction. Fan mounted control 210 will interrupt power to ceiling fan 206 for one second, and then apply power to reverse the direction of ceiling fan 206. Pressing reversing switch 523 again will cause remote control 211 to send a signal to fan mounted control 210 to reverse fan direction, and fan mounted control 210 will again interrupt power to ceiling fan 206 for one second, and again apply power to once again reverse ceiling fan direction. In a fan using a switched capacitor drop for speed control, the one second delay is necessary to allow the speed control capacitors to discharge before reversing direction. As discussed above in connection with FIG. 10, fan mounted control 210 may use a relay to switch ceiling fan rotation direction, and the capacitors would tend to cause the relay to arc if they were not discharged before the relay were actuated. Alternately, a time delay other than one second may be used to allow the fan to stop before applying power to reverse direction, or to allow a larger capacitor sufficient time to discharge.

Below the fan, light and reversing switches, are a series of switches 528, 529, 530 and 531 for pre-program features which will be described separately in conjunction with FIGS. 2, 5 and 13-22. The preprogrammed features are a series of programs which are permanently stored in the memory of remote control 211 and may be activated with only one touch of appropriate switches 528-531.

Switch 530 may be an auto reverse switch. When auto reverse switch 530 is pressed, remote control 211 may be automatically programmed to reverse the direction of ceiling fan 206 after a predetermined or programmable interval. In addition, the auto reverse program may also reduce fan speed at the same time ceiling fan 206 is reversed. The auto reverse program is especially useful at night, when the user is sleeping. On a warm night, ceiling fan 206 may be switched to rotate in a counterclockwise (downdraft) mode at, for example, medium or high seed to produce a cooling downdraft on the user. During the night, temperatures may drop, and the cooling downdraft may produce too much of a chill on the user. The auto reverse program can be programmed to reverse the fan after a predetermined time period (i.e.—4 hours), a programmable time period input by the user, or at a set temperature sensed by a temperature sensor located at the remote control or at the fan housing.

Switch 531 is the delay off switch. When delay off switch 531 is pressed, remote control 211 may be programmed to shut off power to light fixture 280 and/or ceiling fan 206 after a predetermined time period. In a first embodiment, when delay off switch 531 is pressed, remote control 211 is programmed to turn off power to light fixture 280 after a predetermined amount of time, for example, five minutes. The delay off program allows the user to turn off power to light fixture 280 and still have light enough to leave the room. This embodiment of the delay off program is useful in installations where remote control 211 is located far from an exit. Alternately, the time delay could be longer, for example, 30 minutes. A longer time delay would be useful for energy saving applications where it is desired to turn off fixtures after a predetermined amount of time in order to conserve energy. A longer time period delay off feature may be called an "auto off" feature and may be provided concurrently in remote control 211 as shown in elements 1163 and 1164 of FIG. 11. Regardless of the length of the time delay, clock display 1150 can be used by remote control 211 to display the time remaining in the time delay, so the user is aware when the lights will be turned off. A delayed shut-off for ceiling fan 206 would be useful for energy saving applications as described previously, and also as a comfort feature for example, to allow the fan to shut off after the user has fallen asleep, similar to the "auto reverse" feature.

The remaining pre-programmed switches 528 and 529 may be used for the alternate embodiments of the pre-programmed switches 530 and 531 discussed above, or may be used for other pre-programmed features such as temperature control, security timer, self test, or winter mode.

In a temperature control embodiment, a temperature sensor may be located in the housing of ceiling fan 206 or in remote control 211, or even in infrared remote control 411. Clock display 1150 may be used to display temperature set point and actual temperature, and programming switches 524-527 may be used to program the desired set point. When the temperature control program is activated by pressing pre-programmed switch 528 or 529, the speed of ceiling fan 206 would be controlled by remote control 211 to maintain set point temperature.

In a security timer embodiment, remote control 211 may be programmed to operate ceiling fan 206 and/or light fixture 280 at predetermined times to make the house appear to be occupied. When pre-programmed switch 528 or 529 is pressed, the security program would be activated, and the remote control 211 would control ceiling fan 206 and lighting fixture 280 to operate at typical occupancy hours (i.e. dusk to evening) to discourage burglars. The remote control 211 may be programmed to set the typical occupancy hours based on actual usage and thus be a "learning" control.

In the self test embodiment, the remote control 211 may be programmed to perform a series of self tests for diagnostic or demonstration purposes. A typical self test may exercise each element of display 1112, operate ceiling fan 206 though all ranges of speed and direction, operate light fixture 280 through all ranges of illumination intensity, and prompt the user to exercise each of the switches 521-527 to test switch function. Such self tests are useful when diagnosing service problems and in addition, are useful in selling the remote control feature to a prospective customer.

In the winter mode embodiment, the remote control 211 may be programmed to operate ceiling fan 206 at a slow speed in an updraft direction and periodically increase fan speed for short periods of time. This winter mode is useful for eliminating "hot" and "cold" spots in a room, and the periodic speed changes prevent temperature stratification.

Any of the above pre-programmed embodiments or other pre-programmed features which may become popular with customers may be used in any combination for the four pre-programmed switches 528-531. In addition, a greater or fewer number of pre-programmed features switches may be used. The use of various pre-programmed features allows the manufacturer to tailor the remote control 211 to particular markets or to alter the remote control 211 to provide features which may become popular and eliminate features which are not in demand. For example, the same remote control 211 may be programmed with certain features for commercial use such as energy saving timers, etc. and without other features such as the security mode. Conversely, a remote control 211 targeted for the residential market may be provided with features desirable for residential users such as auto reverse, delay off, or security timer. In an alternate embodiment, one or more of the switches 528-531 may be programmed by the user to store a particular program which is used often. Such an embodiment would allow the user to custom tailor his remote control 211 to his particular needs.

PROGRAMMING

The remaining switches 524 and 527 are used to program remote control 211. When initially powered up, as discussed above, all programs are erased, remote control 211 is in the manual mode, and ceiling fan 206 and light fixture 280 may be controlled by switches 521-523 as described above. Pre-programmed features may be initiated by pressing any one of the pre-programmed feature switches 529-531. Once a program has commenced, the auto indicator 1159 of FIG. 11 will be displayed and the program will commence controlling ceiling fan 208 and light fixture 280. If auto/man switch 527 is pressed, the program will be aborted, and remote control 211 will revert to manual control.

Figure 15:
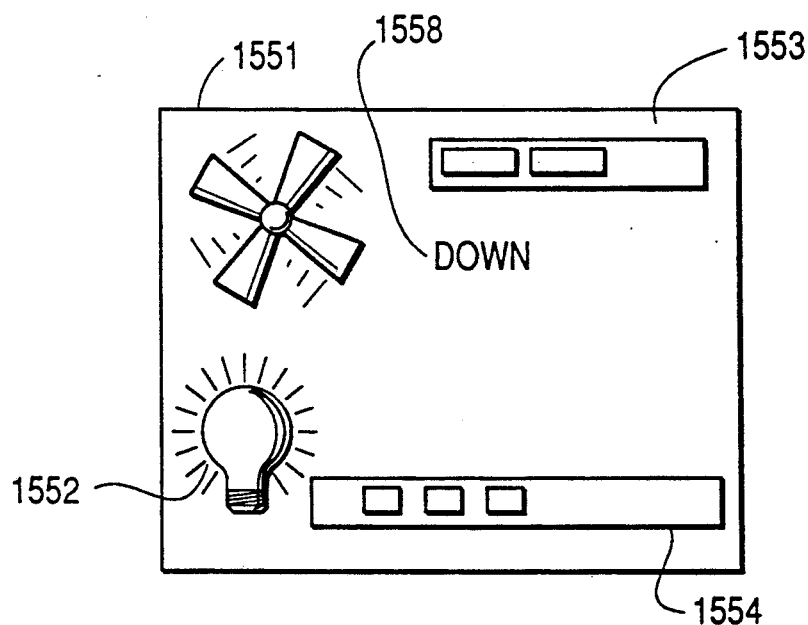
FIG. 15 shows how display 512 appears upon entering program mode.
Figure 16:
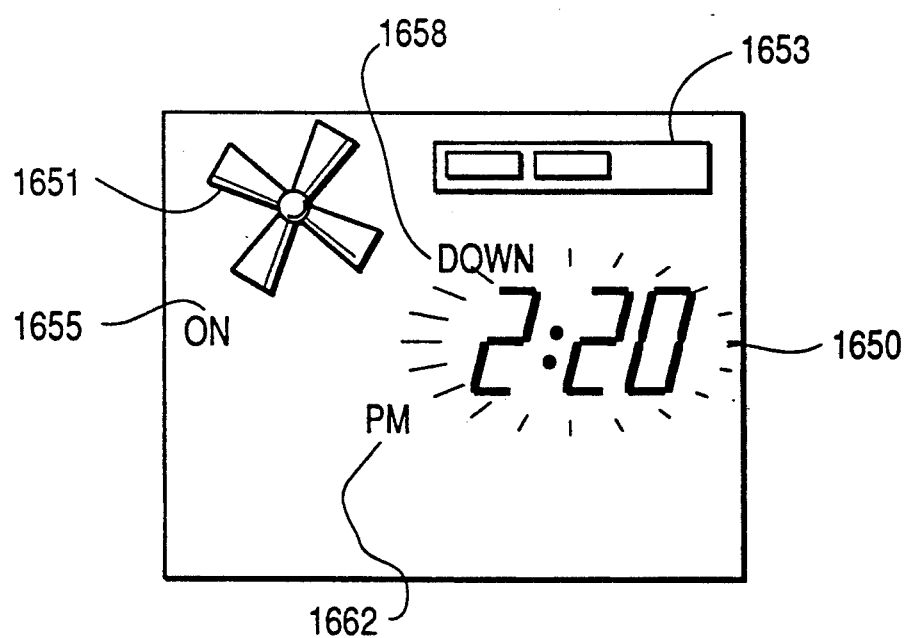
FIG. 16 shows how display 512 appears when entering fan "on" time.
Figure 17:
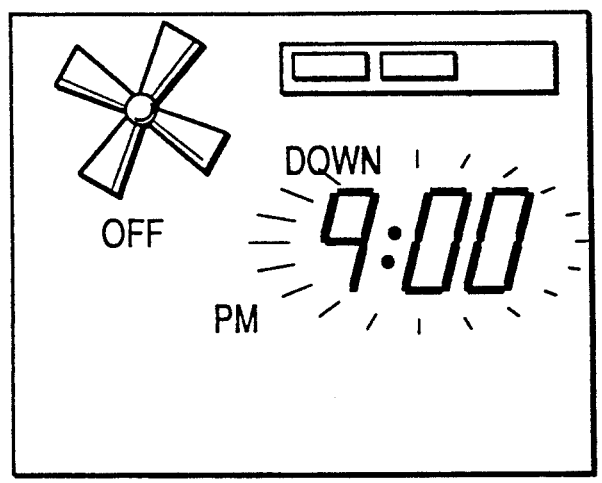
FIG. 17 shows how display 512 appears when entering fan "off" time.

If a user wishes to input a program of his own design, he or she presses program button 524, which places remote control 211 in programming mode. When program button 524 is pressed, display 512 will appear as shown in FIG. 15. Animated fan display 1551 and animated light display 1552 will both flash on and off. The user then selects which appliance he wishes to program, in this case either ceiling fan 206 or light fixture 280, by pressing either fan switch 521 or light switch 522 respectively. If the user has elected to program ceiling fan 206, display 512 will appear as shown in FIG. 16. Animated fan display 1651 will appear along with fan speed indicator 1653 and either up indicator (not shown) or down indicator 1655. Fan speed indicator 1653 will display the speed the fan was last running at before the user entered the programming mode. If the user wishes to program the fan to operate at a different speed, he or she presses and holds fan switch 521 until fan speed indicator 1653 indicates the desired speed. Since remote control 211 is in programming mode, the actual speed of ceiling fan 206 may not change until the program is initiated. Similarly, the direction of rotation displayed may be the same as the direction ceiling fan 206 was rotating before the user entered programming mode. The user may change the direction of rotation of the ceiling fan for the program by pressing reversing switch 523. The appropriate indicator (up indicator 1157 as shown in FIG. 11, or, in this case, down indicator 1558) will be displayed indicating the direction the fan will rotate in during the programmed operation.

Time display 1560 will flash at the "on" time the previous program was set to (if no previous program was entered, then 12:00). The "on" time is the time at which the program will turn on a particular appliance and is indicated by the presence of "on" indicator 1655. The user may set the "on" time by using hour switch 525 and minute switch 526 to adjust the "on" time, similar to the time of day setting procedure outlined above. Once the user is satisfied with his or her choice of "on" time, fan speed, and fan direction, he or she presses program switch 524 again and the display will flash the "off" time shown in FIG. 17.

The user would then adjust the "off" time, if necessary, by pressing hour switch 525 and minute switch 526 similar to the procedure for setting the "on" time. Once the user is satisfied with the "off" time setting, he or she may store the program and exit the program mode by pressing program switch 524 again. The program will be stored in remote control 211 until changed again, barring any power failure.

Light fixture 280 may be programmed in a similar manner to ceiling fan 208. The user would select the "on" and "off" times as before, however, display 512 would display animated light display 1152 and light intensity indicator 1154 shown in FIG. 11. The user would also select the desired light intensity for the programmed operation by holding down light switch 522 until the desired lighting level is displayed by display 1154. The fan program and light fixture program are separate programs which may run concurrently, overlap, or run separately. Further, it is envisioned that multiple programs may be entered into remote control 211 by providing additional program switches 524 (i.e.—PROG1, PROG2, etc.). Transmitter microprocessor 672 of remote control 211 would insure that no incompatible program were entered. In another embodiment, the fan speed, direction, and light intensity may change during program mode to reflect the programmed values being selected by the user. Once program mode is exited, the fan speed, direction, and light intensity would revert back to the settings they were at before program mode was entered.

If the user wishes to execute the program, he or she may press auto/man switch 527 to activate automatic (programmed) operation. When the program is running, auto indicator 1159 of FIG. 11 will be displayed in display 512. Ceiling fan 206 (or light fixture 280) will turn on at the "on" time programmed by the user to the speed and direction (or intensity) programmed by the user and shut off at the "off" time programmed by the user.

Figure 22:
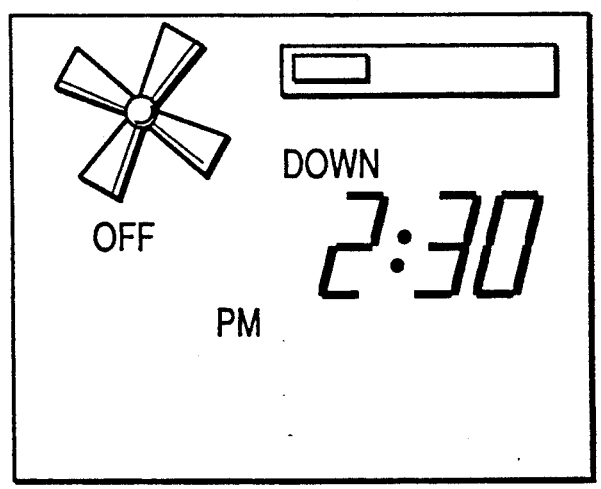
FIG. 22 shows display 512 displaying fan "off" time.
Figure 18:
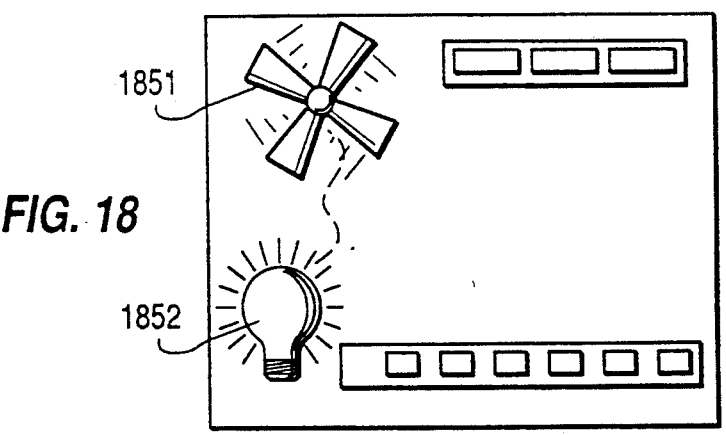
FIG. 18 shows how display 512 appears when listing program information.
Figure 19:
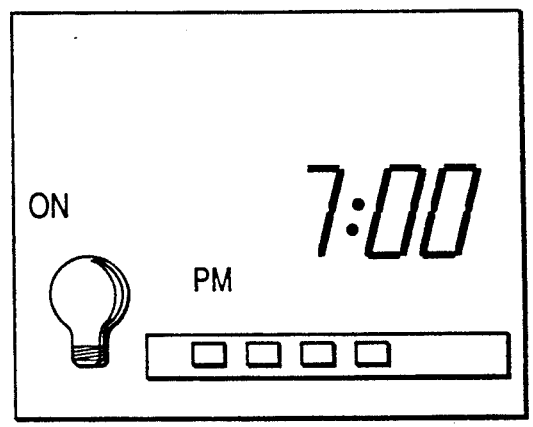
FIG. 19 shows display 512 displaying light fixture "on" time.
Figure 20:
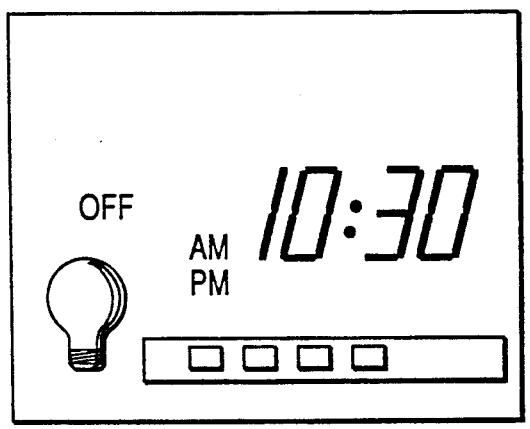
FIG. 20 shows display 512 displaying light fixture "off" time.
Figure 21:
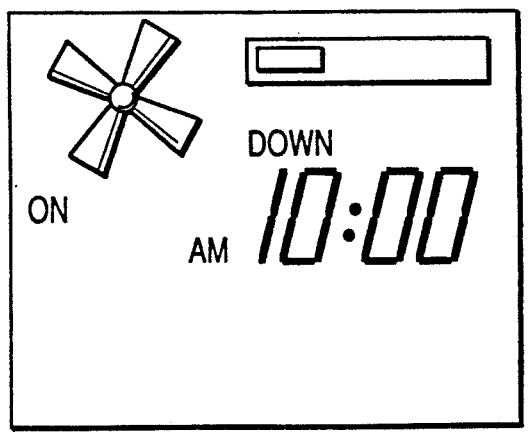
FIG. 21 shows display 512 displaying fan "on" time.

FIGS. 18-22 depict display 512 as it would appear to the user when displaying the programs. To display the program, the user presses program switch 524 to cycle through the program settings. When program switch 524 is first pressed, display 512 will appear as shown in FIG. 18, with both animated fan display 1851 and animated light display 1852 flashing. When program switch 524 is pressed again, the "on" time for the light program will be displayed as shown in FIG. 19. Pressing program switch 524 again will display the "off" time for the light program as shown in FIG. 20. When program switch 524 is pressed again, the display 512 will display the "on" time for the fan program as depicted in FIG. 21. Finally, when program switch 524 is pressed once again, the "off" time for the fan program will be displayed as shown in FIG. 22. To return to the operating mode, the user presses program switch 524 again, and remote control 211 will return to its previous mode of operation (manual or automatic).

Of course, it is envisioned that other programming procedures may be employed, such as used in the many programmable timers, switches, and VCRs known in the art. For example, the "on" time may be programmed for either ceiling fan 206 or light fixture 280 and then a "duration" time input, indicating the amount of time either ceiling fan 206 or light fixture 280 will remain "on". Similarly, remote control 211 may be programmed to operate ceiling fan 206 and light fixture 280 simultaneously on one program only, thereby reducing the cost of remote control 211.

Obviously, many modifications and variations of the present invention are possible in light of the above teachings. For example, all of the features ascribed to remote control 211 may also be practiced with infrared remote control 411. Further, although described in a ceiling fan embodiment, the remote control of the present invention has applications in controlling other household and industrial appliances. In particular, the remote control and communication system of the present invention may be used to control all household appliances. Further, infrared remote control 411 of the present invention may be used in conjunction with remote control 211 to extend the range of infrared control 411 beyond one room. The remote control of the present invention may be modified to interface with similar remote controls for other ceiling fans, or may be modified to communicate with a central appliance controller. Further, the remote control of the present invention may be modified to control more than one appliance. For example, in a commercial embodiment, one control may be used to control a plurality of ceiling fans (i.e.—auditorium, restaurant, etc.).

In addition, although remote control 211 is described as communicating with fan mounted control 210 over a 60 Hz AC power line, other types of power lines may be used (50 Hz, DC, etc.) at varying voltage levels. It is therefore, to be understood that within the scope of the appended claims the invention may be practiced otherwise than as specifically described.

We claim:

1. A remote control for a ceiling fan comprising:
   power supply means for supplying power to said remote control;
   keyboard means for inputting ceiling fan control commands;
   control means coupled to said keyboard means and said power supply means for accepting the ceiling fan control commands and outputting a series of ceiling fan control signals;
   transmitter means coupled to said control means and said power supply means for transmitting the control signals to the ceiling fan; and
   animated fan display means coupled to said control means for displaying an animated pictorial representation of the ceiling fan;
   wherein said animated fan display means is animated to provide an appearance of rotation in a direction consistent with a direction of rotation of the ceiling fan as determined from the ceiling fan control commands from said control means.

2. The remote control of claim 1 wherein said animated fan display means is animated to provide an appearance of rotation in a direction and speed related to a direction and speed of rotation of the ceiling fan as determined from the ceiling fan control commands from said control means.

3. A remote controlled ceiling fan comprising:
   a ceiling fan;
   a remote control comprising:
      first power supply means for supplying power to said remote control;
      keyboard means for inputting ceiling fan control commands;
      first control means coupled to said keyboard means and said first power supply means for accepting the ceiling fan control commands and outputting a series of ceiling fan control signals;
      transmitter means coupled to said first control means and said first power supply means for transmitting said control signals to the ceiling fan; and animated fan display means coupled to said first control means for displaying an animated pictorial representation of said ceiling fan to provide an appearance of rotation of said ceiling fan as determined from the ceiling fan control signals from said first control means, and
   fan control means coupled to said ceiling fan and said remote control, said fan control means comprising:
      second power supply means for providing power to said fan control means;
      receiver means coupled to said second power supply means for receiving the ceiling fan control signals from said remote control and outputting ceiling fan control commands; and second control means coupled to said second power supply means and said receiver means for receiving the ceiling fan control commands and controlling said ceiling fan.

4. The remote controlled ceiling fan of claim 3, wherein said remote control further comprises:
a load line and a neutral line for supplying power to said ceiling fan.

5. The remote controlled ceiling fan of claim 4, wherein said first power supply means is connected in series with said load line and said ceiling fan.

6. The remote controlled ceiling fan of claim 5 wherein said first power supply means further comprises:
triac means coupled in series with said ceiling fan and said load line for providing a voltage drop.

7. The remote controlled ceiling fan of claim 6 wherein said first power supply further comprises:
rectifier means, coupled to said triac means, for rectifying said voltage drop provided by said triac means and outputting a rectified voltage, and
regulator means, coupled to said rectifier means, for regulating and filtering said rectified voltage and outputting a regulated voltage.

8. The remote controlled ceiling fan of claim 3 wherein said first control means comprises a microprocessor.

9. The remote controlled ceiling fan of claim 3, wherein said remote control further comprises:
display means, coupled to said first power supply means and said first control means, for displaying the ceiling fan commands.

10. The remote controlled ceiling fan of claim 9, wherein said first control means further comprises a clock means for providing a clock signal.

11. The remote controlled ceiling fan of claim 10, said display means further comprising:
clock display means for displaying the clock signal.

12. The remote controlled ceiling fan of claim 3, wherein said animated fan display means is animated to provide an appearance of rotation in a direction consistent with a direction of rotation of said ceiling fan as determined from the ceiling fan control signals from said first control means.

13. The remote controlled ceiling fan of claim 12, wherein said animated fan display means is animated to provide an appearance of rotation in a direction and speed consistent with a direction and speed of rotation of said ceiling fan.

14. The remote controlled ceiling fan of claim 3, wherein said ceiling fan further comprises a light fixture and the ceiling fan control commands input to said keyboard means further comprise light fixture control commands and the ceiling fan control signals output from said first control means further comprise light fixture control signals.

15. The remote controlled ceiling fan of claim 14, further comprising:
animated light display means for displaying an animated appearance of brightness consistent with the brightness of said light fixture as determined from the light fixture control commands from said first control means.

16. The remote controlled ceiling fan of claim 14, wherein said control means further comprises:
program means for storing a program for controlling operation of said light fixture.

17. The remote controlled ceiling fan of claim 3, wherein said control means further comprises:

program means for storing a program for controlling operation of the ceiling fan.

18. The remote controlled ceiling fan of claims 16 or 17, wherein said program means may be programmed with the fan control commands input from said keyboard means.

19. The remote controlled ceiling fan of claim 3, wherein said transmitter means further comprises:
infrared transmitter means, coupled to said transmitter means, for transmitting an infrared control signal; and
infrared receiver means for receiving infrared ceiling fan control signals transmitted by said infrared transmitter means and supplying the infrared ceiling fan control signals to said second control means.

20. In a control device for a ceiling fan, an animated display device comprising:
a plurality of fan blade display elements extending radially from a central point, said plurality of fan blade display elements grouped into at least a first and a second group; and
exciter means coupled to said plurality of fan blade display elements for selectively exciting said fan blade display elements to pictorially represent movement of said ceiling fan,
wherein said exciter means selectively excites said fan blade display elements to pictorially represent movement of said ceiling fan as determined from ceiling fan control signals from a said control device.

21. The animated fan display of claim 20, wherein said excited means excites said first group at a first time period and said second group at a second time period to provide an appearance of rotation of said fan blade display elements in a direction consistent with a direction of rotation of the ceiling fan as determined from commands received from said control device.

22. The animated fan display device of claim 21, wherein said exciter means excites said first group during said first time period and said second group during said second time period to provide an appearance of rotation of said fan blade display elements at a speed consistent with a speed of rotation of the ceiling fan.

23. In a control device for a ceiling fan including a light fixture, an animated light display device comprising:
animated light fixture display shaped substantially as a light fixture;
a plurality of animated ray display elements arranged radially from said light fixture display; and
exciter means coupled to said plurality of ray display elements for selectively exciting said light fixture display and said plurality of ray display elements to pictorially illumination of said light fixture,
wherein said exciter means selectively excites said light fixture display and said plurality of ray display elements to pictorially represent illumination of said light fixture as determined from ceiling light control signals from said control device.

24. The animated light display of claim 23, wherein said exciter means excites said light fixture display to indicate intensity of illumination of said light fixture as determined from ceiling light control signals from said control device.

25. The animated light display device of claim 24 wherein said exciter means excites said plurality of ray display elements during a first time period and not during a second time period and vice versa.

* * * * *